US011281604B2

United States Patent
Roberts et al.

(10) Patent No.: US 11,281,604 B2
(45) Date of Patent: Mar. 22, 2022

(54) MULTIPLE MEMORY TYPE SHARED MEMORY BUS SYSTEMS AND METHODS

(71) Applicant: Micron Technology, Inc., Boise, ID (US)

(72) Inventors: David Andrew Roberts, Wellesley, MA (US); Joseph Thomas Pawlowski, Boise, ID (US); Elliott Cooper-Balis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/804,895

(22) Filed: Feb. 28, 2020

(65) Prior Publication Data

US 2021/0271614 A1 Sep. 2, 2021

(51) Int. Cl.
*G06F 1/324* (2019.01)
*G06F 13/16* (2006.01)
*G06F 3/06* (2006.01)
*G06F 1/10* (2006.01)

(52) U.S. Cl.
CPC ............ *G06F 13/1689* (2013.01); *G06F 1/10* (2013.01); *G06F 1/324* (2013.01); *G06F 3/061* (2013.01); *G06F 3/0634* (2013.01); *G06F 3/0685* (2013.01); *G06F 13/1694* (2013.01)

(58) Field of Classification Search
CPC ........ G06F 13/1689; G06F 1/10; G06F 1/324; G06F 3/061; G06F 3/0634; G06F 3/0685; G06F 13/1694
See application file for complete search history.

(56) References Cited

U.S. PATENT DOCUMENTS

| 2005/0044440 A1* | 2/2005 | Barr ......................... G06F 1/08 713/500 |
| 2009/0190427 A1* | 7/2009 | Brittain .................... G11C 5/00 365/212 |
| 2010/0034042 A1* | 2/2010 | Ben-Rubi ................ G11C 5/14 365/226 |

(Continued)

OTHER PUBLICATIONS

Doe Hyun Yoon et al., "BOOM: Enabling Mobile Memory based Low-Power Server DIMMS," 2012 39th Annual International Symposium on Computer Architecture (ISCA), Portland, OR, 2012, pp. 1-12.

*Primary Examiner* — Henry Tsai
*Assistant Examiner* — Harry Z Wang
(74) *Attorney, Agent, or Firm* — Fletcher Yoder, P.C.

(57) ABSTRACT

Techniques for implementing and/or operating an apparatus, which includes a host system, a memory system, and a shared memory bus. The memory system includes a first memory type that is subject to a first memory type-specific timing constraint and a second memory type that is subject to a second memory type-specific timing constraint. Additionally, the shared memory bus is shared by the first memory type and the second memory type. Furthermore, the apparatus utilizes a first time period to communicate with the first memory type via the shared memory bus at least in part by enforcing the first memory type-specific timing constraint during the first time period and utilizes a second time period to communicate with the second memory type via the shared memory bus at least in part by enforcing the second memory type-specific timing constraint during the second time period.

22 Claims, 11 Drawing Sheets

(56) References Cited

U.S. PATENT DOCUMENTS

2011/0320839 A1* 12/2011 David .................. G06F 1/3296
713/322
2012/0311371 A1* 12/2012 Shaeffer ............. G06F 13/1694
713/501

* cited by examiner

MULTIPLE MEMORY TYPE SHARED MEMORY BUS SYSTEMS AND METHODS

BACKGROUND

The present disclosure generally relates to computing systems and, more particularly, to memory (e.g., communication) buses shared by multiple memory types implemented in computing systems.

Generally, a computing system includes a host sub-system and a memory sub-system, which may store data accessible to processing circuitry in the host sub-system. For example, to perform an operation, the processing circuitry may execute corresponding instructions retrieved from a memory device implemented in the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
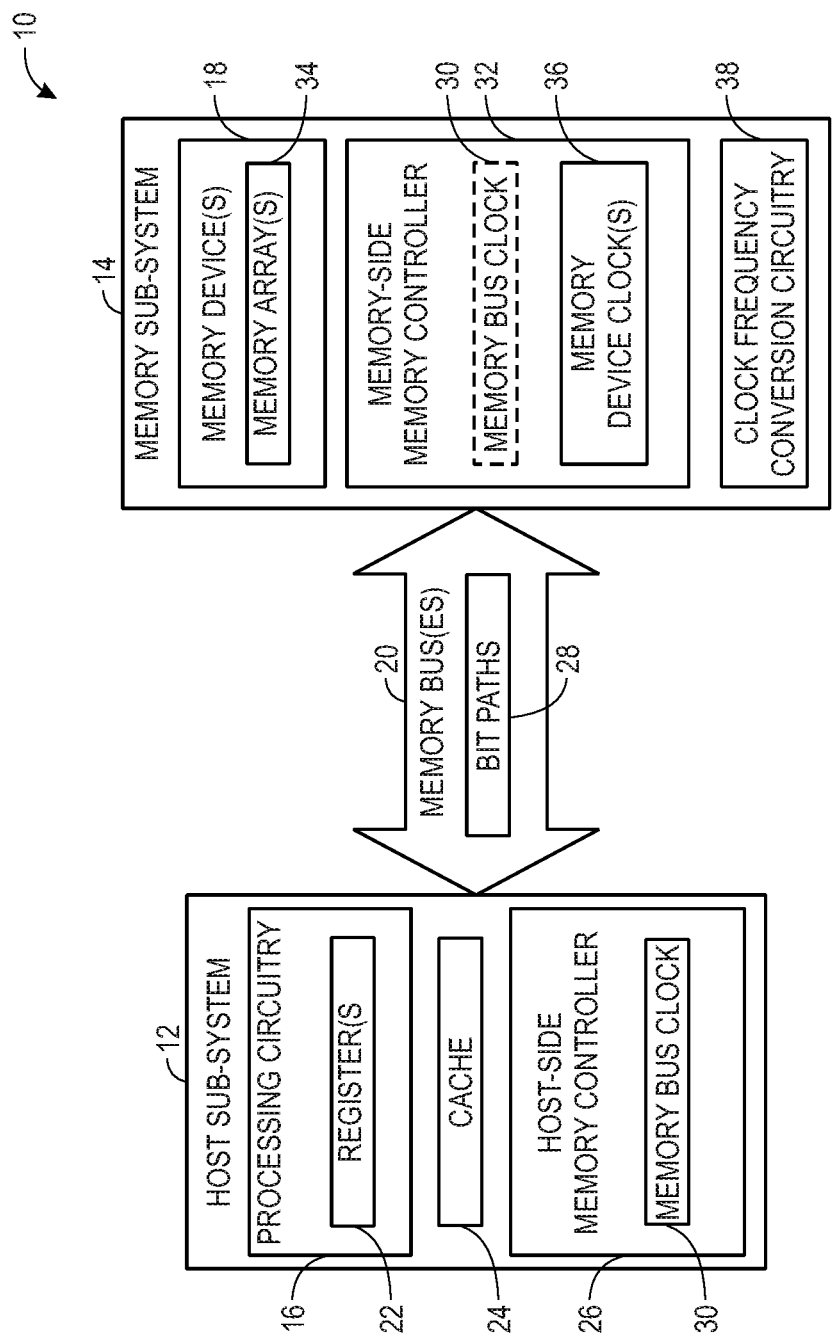
FIG. 1 is a block diagram of a computing system that includes a host (e.g., processing) sub-system and a memory sub-system, in accordance with an embodiment of the present disclosure.

The present disclosure provides techniques that facilitate improving operational efficiency and/or operational reliability of computing systems, for example, by mitigating architectural features that may otherwise limit its operational efficiency and/or operational reliability. Generally, a computing system may include various computing sub-systems, such as a host (e.g., processing) sub-system and a memory sub-system. More specifically, the host sub-system may include processing circuitry, for example, implemented in one or more processors and/or one or more processor cores. The memory sub-system may include one or more memory devices (e.g., chips or integrated circuits), for example, implemented on a memory module, such as a dual in-line memory module (DIMM), and/or organized to implement one or more memory arrays (e.g., banks of memory cells).

Generally, during operation of a computing system, processing circuitry implemented in its host sub-system may perform various operations by executing corresponding instructions, for example, to determine output data by performing a data processing operation on input data. Additionally, a host sub-system may generally include one or more registers and/or one or more host-side (e.g., processor-side) caches, which provide storage locations directly accessible to the host sub-system. However, storage capacity implemented in a host sub-system is generally limited.

As such, a host sub-system is often communicatively coupled to a memory sub-system via one or more memory (e.g., external communication, command, and/or data) buses. In fact, in some instances, a computing system may include multiple memory buses, for example, each dedicated to different types of communication. Merely as an illustrative non-limiting example, the computing system may include a memory command (e.g., control and/or request) bus dedicated to communication of command (e.g., control) signals, for example, indicative of memory access command, such as a memory read command or a memory write command that includes a memory address parameter associated with a storage location in the memory sub-system targeted by the memory access command. The computing system may additionally include a memory data bus dedicated to communication of data signals, for example, indicative of a data block to be stored (e.g., written) in a memory device of the memory sub-system in response to a memory write command and/or a data block retrieved (e.g., read) from the memory device in response to a memory read command.

Moreover, in some instances, memory in a memory sub-system may be implemented using multiple different memory types, for example, to leverage tradeoffs between the different memory types. Merely as an illustrative non-limiting example, the memory sub-system may include one or more volatile memory devices, such as a dynamic random-access memory (DRAM) device and/or a static random-access memory (SRAM) device, to facilitate improving (e.g., increasing) data access speed provided by the memory sub-system as well as one or more non-volatile memory devices, such as a flash (e.g., NAND) memory device, a phase-change memory (e.g., 3D XPoint™) device, and/or a ferroelectric random access memory (FeRAM) device, to facilitate improving data storage density provided by the memory sub-system and/or to enable the memory sub-system to provide data persistence. Additionally or alternatively, the memory sub-system may include one or more static random-access memory (SRAM) devices to facilitate improving data access speed provided by the memory sub-system as well as one or more dynamic random-access memory (DRAM) device to facilitate improving data storage density provided by the memory sub-system and/or reducing physical footprint (e.g., size) of the memory sub-system.

In any case, a memory device in a memory sub-system generally includes memory cells organized into one or more memory arrays (e.g., banks) and memory array control circuitry-namely row select (e.g., decoder) circuitry and column select (e.g., decoder) circuitry. More specifically, in a memory array, the memory cells may be coupled to word lines formed in a first (e.g., horizontal) direction and to bit lines formed in a second (e.g., vertical or orthogonal) direction. In other words, at least in some instances, the memory cells in a memory array may be organized into one or more memory cell rows, for example, which each correspond with a memory page (e.g., word).

Additionally, at least in some instances, the memory cells in a memory cell row may be organized into one or more storage locations, for example, which is each included in a corresponding memory cell column of the memory array. In other words, at least in such instances, a storage location in a memory page may include each of the memory cells coupled to one of multiple corresponding bit lines. Moreover, to facilitate reading (e.g., retrieving) bits from a memory array and/or writing (e.g., storing) bits to the memory array, the bit lines of each memory cell column of the memory array may be coupled to corresponding amplifier circuitry, for example, which includes a driver (e.g., writing) amplifier and/or a sense (e.g., reading) amplifier. As such, at least in some instances, a storage location in a memory array and/or a group of bits (e.g., data block) associated with (e.g., stored at or to be stored at) the storage location may be identified by a memory address parameter, for example, which is indicative of a corresponding physical (e.g., absolute) memory address (e.g., row address and column address pairing) in the memory sub-system.

In any case, operation of a memory device in a memory sub-system is often governed by a memory device clock signal, for example, generated and/or output by a memory device clock. Generally, a memory device clock signal may periodically (e.g., cyclically) alternate between a logic high state (e.g., voltage above threshold) and a logic low state (e.g., voltage below threshold) and, thus, operation of the memory device may be coordinated with logic state changes in the memory device clock signal. For example, the memory device may receive a memory access (e.g., read or write) command and/or a bit group (e.g., data block) to be written to its memory array in coordination with logic state changes in the memory device clock signal. Additionally or alternatively, the memory device may execute (e.g., fulfill) a memory access command in coordination with logic state changes in the memory device clock signal, for example, at least in part by transferring bit groups between its memory cells and its amplifier circuitry in coordination with the logic state changes in the memory device clock signal.

As described above, to facilitate communication between its memory sub-system and its host sub-system, a computing system may include one or more memory (e.g., external communication) buses communicatively coupled therebetween. Generally, a memory bus may include one or more bit paths that each enables communication of a digital (e.g., electrical and/or optical) signal and, thus, a corresponding bit (e.g., command bit or data bit). Thus, to facilitate communication via the memory bus, the host sub-system may include a host-side (e.g., processing-side) bus interface coupled to a first side (e.g., end) of the memory bus bit paths and the memory sub-system may include a memory-side bus interface coupled to a second (e.g., different or opposite) side of the memory bus bit paths.

To facilitate improving communication efficiency, a memory bus deployed in a computing system often includes multiple parallel bit paths, for example, each implemented using one or more electrical connectors, such as a wire, a cable, and/or a conductive trace. By implementing a computing system in this manner, the bus interface of a transmitting computing (e.g., host or memory) sub-system may transmit a group of bits (e.g., command bits and/or data bits) via the memory bus by outputting a corresponding group of digital signals to the parallel bit paths of the memory bus. On the other end, the bus interface of a receiving computing sub-system may receive the group of bits transmitted via the memory bus by interpreting the group of digital signals received (e.g., input) from the parallel bit paths of the memory bus.

To facilitate proper interpretation of transmitted digital signals, communication via a memory bus is often governed by a memory bus clock signal, for example, generated and/or output by a memory bus clock. Generally, similar to a memory device clock signal used by a memory device, a memory bus clock signal that governs communication via a memory bus may periodically (e.g., cyclically) alternate between a logic high state (e.g., voltage above threshold) and a logic low state (e.g., voltage below threshold). As such, by supplying the memory bus clock signal to a host-side bus interface and to a memory-side bus interface, communication via the memory bus may be coordinated (e.g., synchronized) with logic state changes in the memory bus clock signal. For example, the bus interface of a receiving computing (e.g., host or memory) sub-system may read a bit (e.g., command bit or data bit) from each bit path of the memory bus in response to (e.g., coordination with) a logic state change in the memory bus clock signal, for example, from the logic high state to the logic low state and/or from the logic low state to the logic high state. As such, the bus interface of a transmitting computing sub-system may output digital signals indicative of corresponding bits, which are to be read from the memory bus in response to a logic state change in the memory bus clock signal, to the bit paths of the memory bus before the logic state change in the memory bus clock signal occurs in the bus interface of the receiving computing sub-system.

As such, the number of bits and, thus, bandwidth of a memory bus per memory bus clock cycle may be limited by the number of parallel bit paths (e.g., bit width) implemented therein. For example, when the memory bus includes sixteen parallel bit paths, a memory sub-system and a host sub-system may communicate up to sixteen bits per memory bus clock cycle. However, while communication via a memory bus may be governed by a memory bus clock signal, as described above, operation of a memory device in a memory sub-system may be governed by a memory device clock signal, for example, generated and/or output by a corresponding memory device clock.

In fact, at least in some instances, the frequency of a memory bus clock signal used in a computing system may differ from a memory device clock signal used by a memory device deployed in its memory sub-system. Moreover, at least in some instances, different memory devices in a memory sub-system may utilize different memory device clock signals and, thus, potentially operate in accordance with different memory device clock frequencies, for example, due to being implemented using different memory types. Merely as an illustrative non-limiting example, one or more volatile memory devices in the memory sub-system may utilize a memory device clock signal with a higher (e.g., faster) frequency while one or more non-volatile memory devices in the memory sub-system utilize a memory device clock signal with a lower (e.g., slower) frequency. Additionally or alternatively, one or more static random-access memory (SRAM) devices in the memory sub-system may utilize a memory device clock signal with a higher frequency while one or more dynamic random-access memory (DRAM) devices in the memory sub-system utilizes a memory device clock signal with a lower frequency.

Furthermore, at least in some instances, different memory devices deployed in a memory sub-system may be subject to one or more different timing constraints, for example, due to being implemented using different memory types and/or due to differences in memory device clock signals used by the memory devices. In particular, at least in some instances, a memory device of a specific memory type may be subject to (e.g., associated with) one or more timing constraints specific to its memory type. In fact, at least in some instances, memory devices of the same memory type in a memory sub-system may each be subject to the same one or more memory type-specific timing constraints, which differ from one or more memory-type specific timing constraints associated with a different memory type implemented in the memory sub-system. As appreciated, timing constraints generally relate to a minimum time between certain commands to certain memory addresses.

In other words, at least in some instances, one or more memory devices of a first memory type in a memory sub-system may each be subject to a first set of one or more memory type-specific timing constraints associated with the first memory type, one or more memory devices of a second (e.g., different) memory type in the memory sub-system may each be subject to a second set of one or more memory type-specific timing constraints associated with the second memory type, and so on. Merely as an illustrative non-limiting example, a volatile memory device may have a shorter command-to-fulfillment timing constraint due to its faster data access (read and/or write) speed while a non-volatile memory device has a longer command-to-fulfillment timing constraint due to its slow data access speed. Additionally or alternatively, the non-volatile memory device may have a longer row-to-column timing constraint, a longer row-to-row timing constraint, a longer column-to-column timing constraint, and/or a longer write-to-read timing constraint compared to the volatile memory device, for example, due to the slower data access speed provided by the non-volatile memory device and/or the lower frequency of the memory device clock signal used by the non-volatile memory device.

Nevertheless, at least in some instances, a computing system may be implemented such that one or more of its memory buses is shared by memory devices in its memory sub-system that are subject to one or more different memory type-specific timing constraints, for example, to facilitate improving operational efficiency and/or reducing implementation associated cost, such as component count and/or physical footprint, compared to implementing a dedicated (e.g., separate) memory bus for communication with each of multiple different memory types in its memory sub-system. However, at least in some instances, differences in timing constraints associated with memory devices sharing the memory bus may result in a conflict occurring at the shared memory bus, which potentially affects (e.g., reduces) operational efficiency and/or operational reliability of the computing system. Merely as an illustrative non-limiting example, a host sub-system coupled to the memory sub-system via the shared memory bus may transmit a first memory access command that requests return of a first data block from a slower (e.g., non-volatile or DRAM) memory device in the memory sub-system and subsequently transmit a second memory access command that requests return of a second data block from a faster (e.g., volatile or SRAM) memory device in the memory sub-system. Due to differences in memory type-specific timing constraints, this may actually result in the memory sub-system attempting to output the first data block retrieved from the slower memory device and the second data block retrieved from the faster memory device at the same time, which, at least in some instances, may result in a conflict that corrupts one or more of the transmitted data blocks and/or that delays return (e.g., transmission) of a retrieved data block.

Accordingly, to facilitate improving computing system operational efficiency and/or operational reliability, the present disclosure provides techniques for implementing and/or operating a computing system to eliminate conflicts (e.g., collisions) occurring at a shared memory (e.g., external communication, command, and/or data) bus that is shared by memory devices having one or more differing timing constraints, for example, due to being implemented using different memory types and/or differences in utilized memory device clock signals. More specifically, the present disclosure provides techniques for selectively (e.g., adaptively) operating the computing system to communicate via the shared memory bus using different operating modes, such as a performance mode or an efficiency mode, based on one or more target operating characteristics, such as a target memory access latency and/or a target power consumption, of the computing system. For example, the computing system may selectively switch from a performance mode, which targets (e.g., utilizes) a higher memory bus clock frequency, to an efficiency mode, which targets a lower memory bus clock frequency, when a target power consumption of the computing system is below a power consumption threshold and/or when a target memory access latency of the computing system is not below a memory access latency threshold. Conversely, the computing system may selectively switch from the efficiency mode to the performance mode when the target power consumption of the computing system is not below the power consumption threshold and/or when the target memory access latency of the computing system is below the memory access latency threshold.

To facilitate eliminating conflicts occurring at the shared memory bus, in some embodiments, one or more of the operating modes of a computing system may utilize different communication time periods of its shared memory bus for communication with memory devices of different memory types implemented in its memory sub-system. For example, as will be described in more detail below, while in the efficiency mode, successive communication cycles (e.g., one or more memory bus clock cycles) of the shared memory bus may be utilized for communication with memory devices of different memory types. Merely as an illustrative non-limiting example, a first efficiency mode memory bus communication cycle may be used for communication with one or more memory devices of a first memory type and continue until a second (e.g., subsequent and/or different) efficiency mode memory bus communication cycle is initiated for communication with a second (e.g., different) memory type in response to communication with a memory device of the second memory type subsequently being targeted.

On the other hand, as will be described in more detail below, while in the performance mode, specific time periods during each communication cycle of the shared memory bus may be dedicated (e.g., specifically allocated) for communication with each of multiple different memory types, thereby enabling each performance mode communication cycle to be used for communication with each of the different memory types. Merely as an illustrative non-limiting example, a first portion (e.g., time period) of each performance mode memory bus communication cycle may be dedicated for communication with memory devices of a first memory type, a second portion of each performance mode memory bus communication cycle may be dedicated for communication with memory devices of a second memory type, and so on. However, it should be appreciated that the performance mode merely enables communication with each of multiple different memory types during a performance mode memory bus communication cycle, but, at least in some instances, communication with each of the different memory types may not necessarily occur during each performance mode memory bus communication cycle.

By utilizing different communication time periods of the shared memory bus for communication with memory devices of different memory types in this manner, the one or more operating modes, such as the performance mode and/or the efficiency mode, of the computing system may facilitate segregating time periods that are subject to different memory type-specific timing constraints. In other words, by allocating the communication via the shared memory bus in this manner, the one or more operating modes may facilitate isolating communication with different memory types via the shared memory bus to different time periods and, thus, enable elimination of conflicts occurring at the shared memory bus during an allotted time period merely by enforcing a subset of memory type-specific timing constraints that govern the memory sub-system—namely a set of one or more memory type-specific timing constraints associated with a corresponding memory type. For example, the computing system may eliminate conflicts occurring at the shared memory bus during a first time period (e.g., first efficiency mode memory bus communication cycle or first portion of a performance mode memory bus communication cycle) utilized for communication with a first memory type merely by enforcing a first set of one or more memory type-specific timing constraints associated with the first memory type during the first time period, eliminate conflicts occurring at the shared memory bus during a second time period (e.g., second efficiency mode memory bus communication cycle or second portion of a performance mode memory bus communication cycle) utilized for communication with a second memory type merely by enforcing a second set of one or more memory type-specific timing constraints associated with the second memory type during the second time period, and so on.

Additionally, the present disclosure provides calibration (e.g., tuning and/or design) techniques for setting (e.g., determining, calibrating, tuning, and/or designing) one or more operational parameters, such as a target memory bus clock frequency, of selectively implemented operating modes, such as a performance mode and/or an efficiency mode, of a computing system, for example, via a calibration process performed at least in part by a calibration system (e.g., one or more calibration devices) offline and/or before commercial deployment of the computing system. As described above, in some embodiments, a target memory bus clock frequency of the efficiency mode may be set (e.g., calibrated) lower than a target memory bus clock frequency of the performance mode. For example, the calibration process may set the target efficiency mode target memory bus clock frequency to match the frequency of the fastest memory device clock signal used in a memory sub-system of the computing system. On the other hand, in some embodiments, a target memory bus clock frequency of the performance mode may be set such that bandwidth provided by the shared memory bus during a communication cycle (e.g., one or more memory bus clock cycles) of the shared memory bus is an integer multiple of the sum of the maximum sustainable bandwidth of each memory type in the memory sub-system over a time period that matches a target duration of the memory bus communication cycle.

As such, to facilitate determining a target performance mode memory bus clock frequency, in some embodiments, a calibration process may determine a target duration of a performance mode memory bus communication cycle. For example, the calibration process may set the target performance mode memory bus communication cycle duration as a least common multiple of the memory device clock cycle durations (e.g., periods) of the memory device clock signals used in the memory sub-system. Merely as an illustrative non-limiting example, when a first memory type in the memory sub-system uses a first memory device clock signal, which has a frequency of 100 MHz and, thus, a memory device clock cycle duration of 10 µs, and a second memory type in the memory sub-system uses a second memory device clock signal, which has a frequency of 200 MHz and, thus, a memory device clock cycle duration of 5 µs, the calibration process may set the target performance mode memory bus communication cycle duration as 10 µs.

Based on the target duration, the calibration process may then determine a target performance mode bandwidth to be provided by the shared memory bus during a performance mode memory bus communication cycle. To facilitate optimizing (e.g., reducing) memory access latency resulting from the memory device clock frequencies used in the memory sub-system, in some embodiments, the target performance mode memory bus communication cycle bandwidth may be set based on the maximum bandwidth sustainable by each memory type deployed in the memory sub-system during a performance mode memory bus communication cycle with the target duration. To determine a maximum sustainable memory bus communication cycle bandwidth for a specific memory type, the calibration process may multiply the bit width (e.g., number of parallel bit paths) of the shared memory bus with the frequency of a memory device clock signal used by the specific memory type and a maximum number of memory device clock cycles used to communicate with the memory type during a time period that matches the target performance mode memory bus clock cycle duration.

The calibration process may then determine the target performance mode memory bus communication cycle bandwidth by summing together the maximum sustainable memory bus communication cycle bandwidths associated with each of the different memory types implemented in the memory sub-system. Additionally, the calibration process may then determine the target performance mode memory bus clock frequency by dividing the target performance mode memory bus communication cycle bandwidth by the bit width of the shared memory bus and the target performance mode memory bus communication cycle duration. Accordingly, in some embodiments, a performance mode memory bus communication cycle may include multiple memory bus clock cycles and a target performance mode memory bus clock frequency may be set higher than the frequency of each memory device clock signal used in a memory sub-system, for example, to enable each performance mode memory bus communication cycle to be used for communication with each of multiple different memory types implemented in the memory sub-system.

As such, in addition to the target performance mode memory bus clock frequency, in some embodiments, the operational parameters of the performance mode may include one or more performance mode clock frequency conversion factors, which may each be used to convert between the target performance mode memory bus clock frequency and the frequency of a corresponding memory device clock signal. For example, the performance mode clock frequency conversion factors may include a first memory type performance mode clock frequency conversion factor, which is used to convert between the target performance mode memory bus clock frequency and the frequency of a first memory device clock signal used by memory devices of a first memory type, a second memory type performance mode clock frequency conversion factor, which is used to convert between the target performance mode memory bus clock frequency and the frequency of a second memory device clock signal used by memory devices of a second memory type, and so on. Additionally, in some embodiments, a calibration process may set a performance mode clock frequency conversion factor as a ratio of the target performance mode memory bus clock frequency to a corresponding memory device clock frequency. For example, the calibration process may set the first memory type performance mode clock frequency conversion factor as a ratio of the target performance mode memory bus clock frequency to the frequency of the first memory device clock signal, the second memory type performance mode clock frequency conversion factor as a ratio of the target performance mode memory bus clock frequency to the frequency of the second memory device clock signal, and so on.

Furthermore, in some embodiments, the operational parameters of the performance mode may include a target allocation (e.g., division) of a performance mode memory bus communication cycle between each of the different memory types implemented in the memory sub-system. In other words, in some such embodiments, a calibration process may allocate different portions (e.g., time slots) of each performance mode memory bus communication cycle for communication with different memory types implemented in the memory sub-system, for example, based at least in part on associated performance mode clock frequency conversion factors. Merely as an illustrative non-limiting example, the calibration process may specifically allocate a portion (e.g., time period) of a performance mode memory bus communication cycle for communication with a specific memory type such that a ratio of the duration of the specifically allocated portion to the total duration of the performance mode memory bus communication cycle matches a ratio of a corresponding memory device clock frequency to the target performance mode memory bus clock frequency (e.g., inverse of associated clock frequency conversion factor).

Since frequency of memory device clock signals used in a memory sub-system may differ from a target memory bus clock frequency, to facilitate interoperation, in some embodiments, the memory sub-system may include clock frequency conversion circuitry implemented and/or operated to convert digital signals between the memory bus clock frequency and memory device clock frequencies based at least in part on corresponding (e.g., performance mode or efficiency mode) clock frequency conversion factors. For example, when the clock frequency conversion factor associated with a memory device has a value of two, the clock frequency conversion circuitry may double (e.g., expand and/or increase) the duration of digital signals received from the shared memory bus before output to the memory device and/or halve (e.g., contract and/or decrease) the duration of digital signals received from the memory device before output to the shared memory bus. Additionally or alternatively, the clock frequency conversion circuitry may advance transmission (e.g., output) time of digital signals when communication with a corresponding memory type is allocated to an earlier portion of a performance mode memory bus communication cycle and/or delay the transmission time of the digital signals when communication with the corresponding memory type is allocated to a later portion of the performance mode memory bus communication cycle.

Thus, by implementing operational parameters of a performance mode calibrated in this manner, a computing system may enable communication between its host (e.g., processing) sub-system and memory devices of each of multiple different memory types implemented in its memory sub-system during each communication cycle of a shared memory bus coupled there between, which, at least in some instances, may facilitate improving computing system operational efficiency, for example, by reducing memory access latency compared to another operating mode that only enables communication with memory devices of a single memory type during each memory bus communication cycle. Moreover, by specifically allocating (e.g., dedicating) different portions of a performance mode memory bus communication cycle for communication with different memory types, as described above, the performance mode may facilitate isolating communication with different memory types via the shared memory bus to different time periods and, thus, enable eliminating likelihood of a conflict occurring at the shared memory bus during a specifically allocated portion of the performance mode memory bus communication cycle merely by enforcing a set of one or more memory type-specific timing constraints associated with a corresponding memory type. For example, while in the performance mode, the computing system may eliminate likelihood of a conflict occurring at the shared memory bus during a first portion of the performance mode memory bus communication cycle, which is specifically allocated for communication with a first memory type, merely by enforcing a first set of one or more memory type-specific timing constraints associated with the first memory type during the first portion of the performance mode memory bus communication cycle, eliminating the likelihood of a conflict occurring at the shared memory bus during a second portion of the performance mode memory bus communication cycle, which is specifically allocated for communication with a second memory type, merely by enforcing a second set of one or more memory type-specific timing constraints associated with the second memory type during the second portion of the performance mode memory bus communication cycle, and so on. As will be appreciated, in accordance with embodiments of the present invention simplified memory controller design may be employed. However, it should be noted that existing mechanisms for tracking timing constraints, per memory type, can still be used. Further, embodiments of the present invention provide greater flexibility as any individual device timing constraints can be changed without any possible conflicts with other devices.

However, communication (e.g., propagation) of digital (e.g., electrical and/or optical) signals over (e.g., through) a memory bus, such as a shared memory bus, is generally non-instantaneous. Moreover, switching a bus interface of a computing (e.g., host or memory) sub-system between transmission (e.g., output) of digital signals to a shared memory bus and reception (e.g., input and/or interpretation) of digital electrical signals from the shared memory bus is often non-instantaneous, for example, due to switching (e.g., gating) of input/output (I/O) circuitry in the bus interface between a transmission state (e.g., mode) and a reception state occurring non-instantaneously. To facilitate elimination of conflicts occurring due to the non-instantaneous nature of communication between a memory sub-system and the host sub-system, in some embodiments, the computing system may enforce a memory bus direction change timing constraint immediately before communication direction on the shared memory bus is expected to change. To help illustrate, continuing with the above example, the computing system may enforce the memory bus direction change timing constraint between the first portion of the performance mode memory bus communication cycle and the second portion of the performance mode memory bus communication cycle when the host sub-system transmits data bits for storage in the first memory type of the memory sub-system via the shared memory bus during the first portion of the performance mode memory bus communication cycle and the memory sub-system is expected to subsequently transmit data bits retrieved from the second memory type to the host sub-system via the shared memory bus during the second portion of performance mode memory bus communication cycle.

In some embodiments, a computing system may enforce a memory bus direction change timing constraint while operating in the performance mode as well as while operating in the efficiency mode, for example, due to communication in the efficiency mode also occurring non-instantaneously. In other words, in such embodiments, the target duration of a memory bus direction change timing constraint may be an operational parameter common to multiple operating modes of a computing system and, thus, determined (e.g., designed, tuned, and/or calibrated) via a calibration process. For example, to facilitate accounting for non-instantaneous propagation of digital signals on the shared memory bus, the calibration process may set the target duration of the memory bus direction change timing constraint to match the duration of a single clock cycle of a memory bus clock signal. Additionally or alternatively, the calibration process may set the target duration of the memory bus direction change timing constraint to match an expected duration for switching (e.g., gating) input/output (I/O) circuitry in a memory-side bus interface and/or a host-side bus interface between its transmission state and its reception state.

In any case, as described above, operating a computing system to communicate via a shared memory bus in a performance mode may facilitate reducing memory access latency provided by its memory sub-system due at least in part to the target performance mode memory bus clock frequency being set higher than the frequency of each memory device clock signal used in its memory sub-system. However, power consumption of a computing system may generally vary with the frequency of a clock signal that governs its operation. For example, power consumption may generally increase as frequency of a memory bus clock signal, which governs communication via a shared memory bus, increases and decrease as frequency of the memory bus clock signal decreases.

Accordingly, as described above, in some embodiments, a computing system may selectively switch from the performance mode to an efficiency mode, which targets a lower memory bus clock frequency, for example, when a target power consumption of the computing system is below a power consumption threshold and/or when a target memory access latency of the computing system is not below a memory access latency threshold. In particular, as described above, the target efficiency mode memory bus clock frequency may be set lower than the target performance mode memory bus clock frequency, for example, via a calibration (e.g., design and/or tuning) process performed by a calibration system (e.g., one or more calibration devices) offline and/or before commercial deployment of the computing system. Merely as an illustrative non-limiting example, the target efficiency mode target memory bus clock frequency may be set to match the frequency of the fastest memory device clock signal used in a memory sub-system of the computing system.

In addition to the target efficiency mode memory bus clock frequency, similar to the performance mode, the operational parameters of the efficiency mode may include one or more efficiency mode clock frequency conversion factors, which may each be used to convert between the target efficiency mode memory bus clock frequency and the frequency of a corresponding memory device clock signal. For example, similar to a performance mode clock frequency conversion factor, a calibration process may set an efficiency mode clock frequency conversion factor, which is to be used to convert between the target efficiency mode memory bus clock frequency and a memory device clock frequency, as a ratio of the target efficiency mode memory bus clock frequency to the memory device clock frequency. However, as described above, the target efficiency mode memory bus clock frequency may differ from the target performance mode memory bus clock frequency and, thus, an efficiency mode clock frequency conversion factor associated with a memory type may differ from the performance mode clock frequency conversion factor associated with the memory type.

Moreover, while in the efficiency mode, as described above, different memory bus communication cycles of a shared memory bus may be used for communication with different memory types. For example, a first efficiency mode memory bus communication cycle may be used for communication with memory devices of a first memory type and continue until a second (e.g., subsequent and/or different) efficiency mode memory bus communication cycle is initiated for communication with a second (e.g., different) memory type in response to communication with a memory device of the second memory type subsequently being targeted. By utilizing different efficiency mode memory bus communication cycle for communication with different memory types, as described above, the efficiency mode may facilitate isolating communication with different memory types via the shared memory bus to different time periods and, thus, enable eliminating the likelihood of a conflict occurring at the shared memory bus during an efficiency mode memory bus communication cycle used for communication with a specific memory type merely by enforcing a set of one or more memory type-specific timing constraints associated with the memory type during the efficiency mode memory bus communication cycle. However, even when memory type-specific timing constraints are enforced in this manner, at least in some instances, a conflict may occur at a shared memory bus between successive efficiency mode memory bus communication cycles, for example, due at least in part to a corresponding change in the memory type with which the shared memory bus is communicating.

Thus, to facilitate elimination of conflicts occurring at a shared memory bus while operating in the efficiency mode, in some embodiments, the operational parameters of the efficiency mode may additionally include one or more memory type change timing constraints, which may each be enforced immediately before communication via the shared memory bus changes from communication with a memory device of a corresponding memory type to communication with another memory device of a different memory type. For example, when a memory sub-system includes a first memory type and a second memory type, the memory type change timing constraints may include a first memory type-to-second memory type timing constraint, which is introduced immediately before a shared memory bus changes from communication with a memory device of the first memory type to communication with a memory device of the second memory type. The memory type change timing constraints may additionally include a second memory type-to-first memory type timing constraint, which is introduced immediately before the shared memory bus changes from communication with a memory device of the second memory type to communication with a memory device of the first memory type.

In some embodiments, a calibration process may set a target duration of a memory type change timing constraint, which is to be introduced when the shared memory bus changes from communication with a corresponding memory type to communication with a different memory type, to match the duration of a longest (e.g., maximum) command-to-fulfillment timing constraint associated with (e.g., specific to) the corresponding memory type. For example, the calibration process may set the first memory type-to-second memory type timing constraint to match the duration of a longest command-to-fulfillment timing constraint associated with the first memory type. Additionally or alternatively, the calibration process may set the second memory type-to-first memory type timing constraint to match the duration of a longest command-to-fulfillment timing constraint associated with the second memory type.

By enforcing a memory type change timing constraint set in this manner, the efficiency mode may enable the computing system to eliminate likelihood of a conflict occurring at the shared memory bus, for example, due to enforcement of the memory type change timing constraint reducing likelihood of subsequent communication via the shared memory bus occurring before fulfillment of a previous memory access request and, thus, potentially conflicting with fulfillment of the previous memory access request. Moreover, as described above, in some embodiments, the computing system may selectively switch between the efficiency mode and a performance mode, which also eliminates conflicts occurring at the shared memory bus, based at least in part on a target power consumption of the computing system and/or a target memory access latency to be provided by its memory sub-system. In this manner, as will be described in more detail below, the techniques described in the present disclosure may enable a computing system to adaptively (e.g., selectively) adjust (e.g., tradeoff) its power consumption and/or the memory access latency provided by its memory sub-system while nevertheless eliminating conflicts occurring at a shared memory bus coupled between the memory sub-system and its host (e.g., processing) sub-system, which, at least in some instances, may facilitate improving operational efficiency and/or operational reliability of the computing system.

To help illustrate, an example of a computing system 10 (e.g., apparatus), which includes a host (e.g., processing) sub-system (e.g., system) 12 and a memory sub-system (e.g., system) 14, is shown in FIG. 1. It should be appreciated that the depicted example is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the host sub-system 12 and the memory sub-system 14 may be implemented in a host device while other computing sub-systems, such as the user input sub-system and/or the display sub-system, may be implemented in a client (e.g., remote) device. In fact, in some embodiments, a computing sub-system may be distributed between multiple electronic devices. For example, a first portion of the host sub-system 12 and/or a first portion of the memory sub-system 14 may be implemented in a host device while a second portion of the host sub-system 12 and/or a second portion of the memory sub-system 14 may be implemented in a client device.

In any case, during operation of the computing system 10, the host sub-system 12 generally performs various operations, for example, to determine output data by executing instructions in a processor to perform a corresponding data processing operation on input data. Thus, as in the depicted example, the host sub-system 12 may include processing circuitry 16. In some embodiments, the processing circuitry 16 may be included in one or more central processing units (CPUs), one or more graphics processing units (GPUs), one or more processor cores, or any combination thereof.

Additionally, as in the depicted example, the host sub-system 12 may include one or more registers 22. Furthermore, in some embodiments, the host sub-system 12 may include one or more host-side caches 24. In particular, in some embodiments, one or more of the host-side caches 24 may be integrated with the processing circuitry 16. For example, the host-side caches 24 may include a level one (L1) cache, a level two (L2) cache, and/or a level three (L3) cache implemented along with the processing circuitry 16 in a processor chip.

As such, a host-side cache 24 and/or a register 22 implemented in a host sub-system 12 may provide one or more storage locations directly accessible to its processing circuitry 16. To facilitate controlling storage therein, as in the depicted example, the host sub-system 12 may include a host-side memory controller 26, for example, communicatively coupled to the registers 22 and/or the host-side caches 24 via one or more host-side internal buses. However, storage capacity of the registers 22 and/or the host-side caches 24 is generally limited. Thus, as in the depicted example, the host sub-system 12 may be communicatively coupled to the memory sub-system 14, which provides additional data storage capacity, via one or more memory (e.g., external communication) buses 20.

In fact, in some embodiments, a computing system 10 may include multiple memory buses 20, for example, each dedicated to different types of communication between the memory sub-system 14 and the host sub-system 12. Merely as an illustrative non-limiting example, the computing system 10 may include a memory command (e.g., control and/or request) bus 20 dedicated to communication of command (e.g., control) signals, for example, indicative of memory access command, such as a memory read command or a memory write command that includes a memory address parameter associated with a storage location in the memory sub-system targeted by the memory access command. The computing system 10 may additionally include a memory data bus 20 dedicated to communication of data signals, for example, indicative of a data block to be stored (e.g., written) in the memory sub-system 14 in response to a memory write command and/or a data block retrieved from the memory sub-system 14 in response to a memory read command.

In any case, as in the depicted example, a memory bus 20 may include multiple parallel bit paths 28. In some embodiments, a bit path 28 in the memory bus 20 may include one or more electrical connectors, such as one or more wires, one or more conductive traces, or any combination thereof. Additionally or alternatively, a bit path 28 in the memory bus 20 may include one or more optical connectors, such as one or more fiber optic cables, one or more communication networks, or any combination thereof.

In other words, by implementing multiple parallel bit paths 28 therein, a memory bus 20 may enable multiple digital (e.g., electrical and/or optical) signals and, thus, corresponding bits (e.g., command bits and/or data bits) to be concurrently communicated there through as a group. In particular, a transmitting computing (e.g., host or memory) sub-system may transmit a group of bits (e.g., command bits and/or data bits) via the memory bus 20 by outputting a corresponding group digital signals to the parallel bit paths 28 of the memory bus 20. On the other hand, a receiving computing (e.g., host or memory) sub-system may receive the group of bits transmitted via the memory bus 20 by interpreting the group of digital signals received (e.g., input) from the parallel bit paths 28 of the memory bus 20.

To facilitate proper interpretation of digital signals, communication between the memory sub-system 14 and the host sub-system 12 via a memory bus 20 may generally be governed by a memory bus clock signal generated and/or output by a memory bus clock 30. As in the depicted example, in some embodiments, the memory bus clock 30 may be implemented in the host-side memory controller 32. When the memory bus clock 30 is implemented in a first computing (e.g., host) sub-system, but not a second (e.g., memory) sub-system, to facilitate coordinating (e.g., synchronizing) communication via a memory bus 20, the first computing sub-system may transmit the memory bus clock signal generated by the memory bus clock 30 to the second computing sub-system, for example, via a bit path 28 of the memory bus 20 and/or a dedicated (e.g., separate) bit path 28. In other embodiments, the memory bus clock 30 may additionally or alternatively be implemented in the memory sub-system 14, for example, in a memory-side memory controller 32 that is implemented and/or operated to control storage in the memory sub-system 14.

To provide storage, as in the depicted example, the memory sub-system 14 may include one or more memory devices 18 (e.g., chips or integrated circuits). As will be described in more detail below, the memory devices 18 may include memory cells (e.g., circuitry) organized into one or more memory arrays 34 and, thus, may include one or more tangible, non-transitory, computer-readable media. Additionally, operation of a memory device 18 may generally be governed by a memory device clock signal generated and/or output from a memory device clock 36, for example, implemented in the memory-side memory controller 32. Merely as an illustrative non-limiting example, the memory device 18 may receive a memory access (e.g., read or write) command and/or a data block to be written to its memory array 34 in coordination with logic state changes in the memory device clock signal. Additionally or alternatively, the memory device 18 may execute (e.g., fulfill) a memory access command in coordination with logic state changes in the memory device clock signal, for example, at least in part by transferring bits between its memory cells and its amplifier circuitry in coordination with logic state changes in the memory device clock signal.

However, at least in some instances, the frequency of a memory device clock signal that governs operation of a memory device 18 may differ from the frequency of a memory bus clock signal that governs communication via a memory bus 20. Accordingly, to facilitate communication between the memory bus 20 and the memory device 18, the memory sub-system 14 may include clock frequency conversion circuitry 38 that is implemented and/or operated to convert digital signals between the one or more memory device clock frequencies and the memory bus clock frequency. For example, when the memory device clock frequency is lower than the memory bus clock frequency, the clock frequency conversion circuitry 38 may expand (e.g., increase) duration of a digital signal received from a memory bus 20 before supply to the memory device 18 and/or contract (e.g., reduce) duration of a digital signal received from the memory device 18 before supply to the memory bus 20. Additionally or alternatively, the clock frequency conversion circuitry may advance transmission (e.g., output) time of digital signals when communication with the memory device 18 is allocated to an earlier portion of a memory bus communication cycle and/or delay transmission time of the digital signals when communication with the memory device 18 is allocated to a later portion of the memory bus communication cycle.

In some embodiments, the memory devices 18 in the memory sub-system 14 may be implemented with multiple different memory types. In fact, in some such embodiments, memory devices 18 implemented using different memory types may operate in accordance with different memory device clock signals. In other words, in such embodiments, operation of different memory type memory devices 18 may be governed by different memory device clock frequencies and, thus, subject to different memory type-specific timing constraints. Nevertheless, in some embodiments, the same memory bus 20 may be used to communicate with memory devices 18 of each of the different memory types and, thus, shared by multiple different memory types implemented in the memory sub-system 14.

Figure 2:
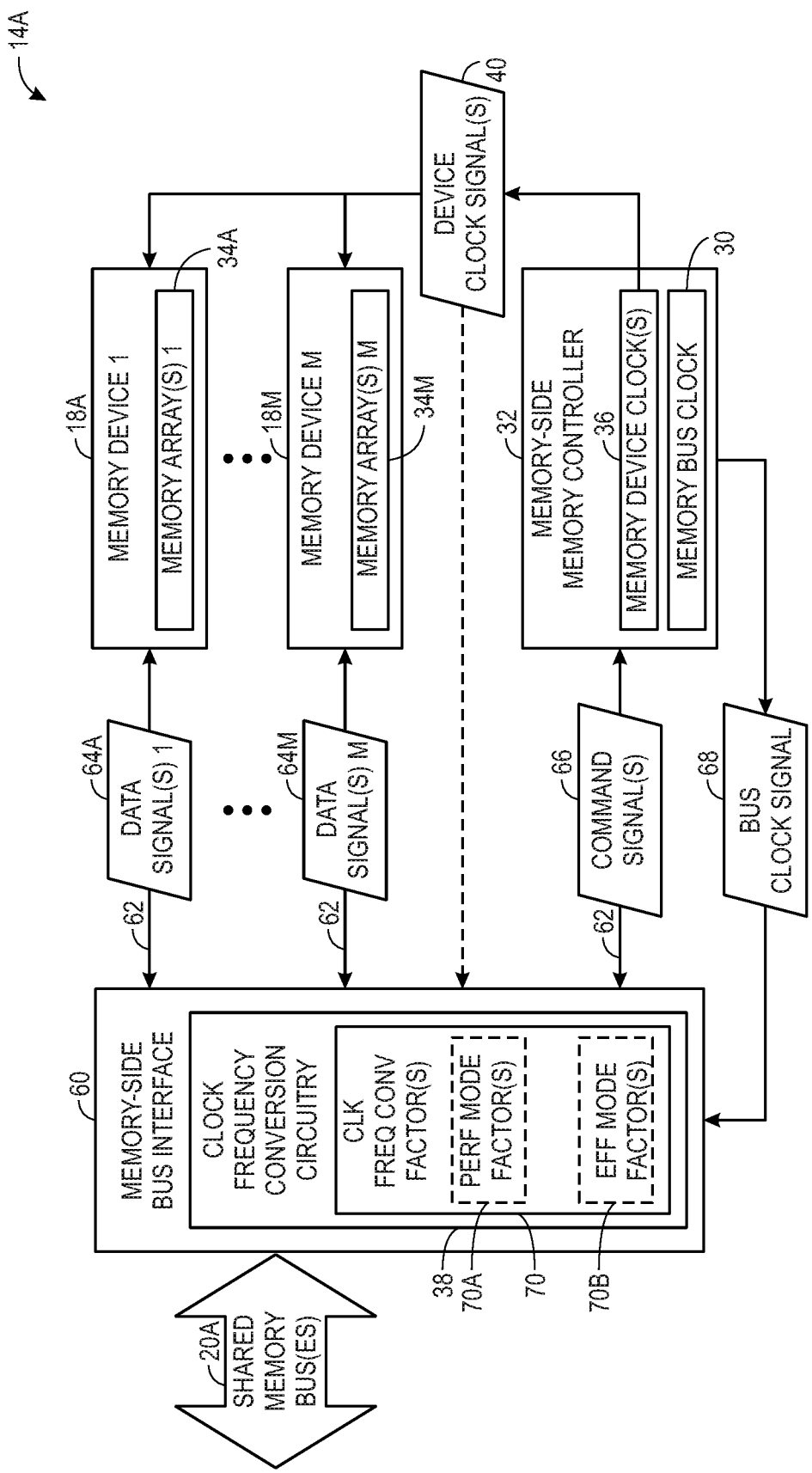
FIG. 2 is a block diagram of an example of the memory sub-system of FIG. 1, in accordance with an embodiment of the present disclosure.

To help illustrate, an example of a memory sub-system 14A, which is coupled to one or more shared memory buses 20A, is shown in FIG. 2. As depicted, the memory sub-system 14A includes multiple memory devices 18. As described above, to facilitate leveraging tradeoffs, in some embodiments, different memory devices 18 in a memory sub-system 14 may be implemented using different memory types. Merely for illustrative purposes, a first memory array 34A of a first memory device 18A is implemented using a first memory type while an Mth memory array 34M of an Mth memory device is implemented using an Mth memory type, which is different from the first memory type.

For example, in some embodiments, the first memory array may be implemented with volatile memory and, thus, the first memory device 18A may be a volatile memory device 18 while the Mth memory array 34M is implemented with non-volatile memory and, thus, the Mth memory device 18M may be a non-volatile memory device 18. In other words, in such embodiments, the first memory device 18A may include a dynamic random-access memory (DRAM) device, a static random-access memory (SRAM) devices, or both while the Mth memory device 18M may include a flash (e.g., NAND) memory device, a phase-change memory (e.g., 3D XPoint™) device, a ferroelectric random access memory (FeRAM) device, a solid state drive (SSD), a hard disk drive (HDD), or any combination thereof. In other embodiments, the first memory array may be implemented with static random-access memory (SRAM) and, thus, the first memory device 18A may be a static random-access memory device while the Mth memory array 34M is implemented with dynamic random-access memory (DRAM) and, thus, the Mth memory device 18M may be a dynamic random-access memory device.

Furthermore, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices 18 disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

However, it should be appreciated that one or more of the memory devices 18 may be implemented using other packaging techniques. For example, memory devices 18 may be coupled to a (e.g., silicon) interposer to implement a 2.5D configuration. Additionally or alternatively, memory devices 18 may be stacked to implement a 3D configuration. Furthermore, in some embodiments, memory devices 18 may be implemented using organic packaging techniques. In other words, in some embodiments, the techniques described in the present disclosure may be implemented as an on-package solution.

Moreover, it should be appreciated that the depicted example is merely intended to be illustrative and not limiting. In particular, in other embodiments, a memory sub-system 14 may include more than two memory devices 18 and/or include a memory device 18 that itself includes multiple different memory types. Additionally, in other embodiments, a memory sub-system 14 may include multiple memory devices 18 implemented using the same memory type and, thus, subject to the same memory type-specific timing constraints.

In any case, as described above, operation of a memory device 18 may generally be governed by a corresponding memory device clock signal 40 generated and/or output by a memory device clock 36, for example, implemented in the memory-side memory controller 32. Merely as an illustrative non-limiting example, a memory device 18 may receive a memory access (e.g., read or write) command and/or a data block to be written to its memory array 34 in coordination with logic state changes in a corresponding memory device clock signal. Additionally or alternatively, the memory device 18 may execute (e.g., fulfill) a memory access request in coordination with logic state changes in the corresponding memory device clock signal, for example, at least in part by transferring bits between memory cells in its memory array 34 and its amplifier circuitry in coordination with logic state changes in the memory device clock signal.

Figure 3:
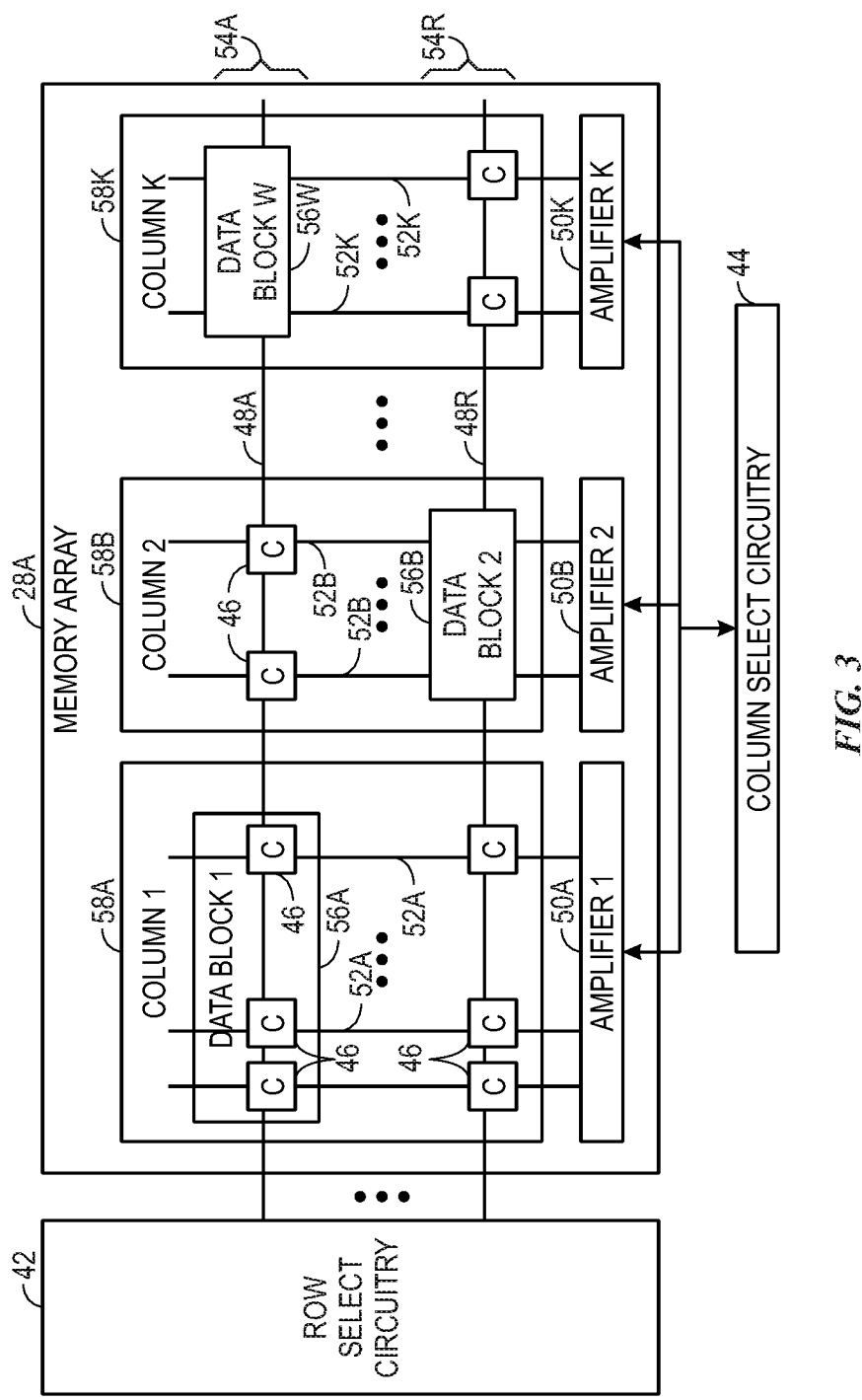
FIG. 3 is a block diagram of an example memory array implemented in the memory sub-system of FIG. 2, in accordance with an embodiment of the present disclosure.

To help illustrate, an example of a memory array 34, which may be implemented in one or more memory devices 18, is shown in FIG. 3. As in the depicted example, the memory array 34 may be coupled to memory array control circuitry—namely row select (e.g., decoder) circuitry 42 and column select (e.g., decoder) circuitry 44. Additionally, as in the depicted example, the memory array 34 may include memory cells 46 coupled to the row select circuitry 42 via word lines 48 formed in a first (e.g., horizontal) direction and to amplifier circuitry 50 via bit lines 52 formed in a second (e.g., vertical) direction.

In some embodiments, each memory cell 46 may include a switching component, such as a metal-oxide-semiconductor field-effect transistor (MOSFET), and a storage component, such as a capacitor. For example, a memory cell 46 may be implemented such that its MOSFET is coupled between a bit line 52 and its storage capacitor and the gate of its MOSFET is coupled to a word line 48. As such, in some embodiments, each memory cell 46 may be used to store one bit. For example, a memory cell 46 may indicate a 1-bit (e.g., logic high bit) when charge stored therein results in a voltage greater than a threshold voltage. On the other hand, the memory cell 46 may indicate a 0-bit (e.g., logic low bit) when charge stored therein results in a voltage less than the threshold voltage. In other embodiments, a memory cell 46 may be implemented to store multiple bits. For example, a memory cell 46 in Quad-Level Cell (QLC) NAND memory may be implemented to store two bits.

In any case, as in the depicted example, the memory cells 46 may be organized into one or more memory cell rows 54 (e.g., memory pages), which may each be identified by a corresponding row (e.g., page) address, and one or more memory cell columns 58, which may each be identified by a corresponding column address. In some embodiments, a memory cell row 54 may include each of the memory cells 46 coupled to a (e.g., one) word line 48. For example, a first memory cell row 54A (e.g., first memory page) may include each of the memory cells 46 coupled to a first word line 48A, an Rth memory cell row 54R (e.g., Rth memory cell page) may include each of the memory cells 46 coupled to an Rth word line 48R, and so on.

As in the depicted example, organizing the memory array 34A in this manner may enable memory cells 46 to be grouped into storage locations suitable for storage of bit groups 56. For example, a first bit group 56A may be stored at a first storage location including the memory cells 46 in the first memory cell row 54A and a first memory cell column 58A, a second bit group 56B may be stored at a second storage location including the memory cells 46 in the Rth memory cell row 54R and a second memory cell column 58B, and a Wth bit group 56W may be stored at a Wth storage location including the memory cells 46 in the first memory cell row 54A and the Kth memory cell column 58K.

In any case, as described above, row select circuitry 42 may be connected to memory cell rows 54 (e.g., memory pages) of the memory array 34A via corresponding word lines 48. To enable access to (e.g., reading from and/or writing to) storage locations in a memory page, the row select circuitry 42 may activate the memory cells 46 included in the memory page. For example, in some embodiments, the row select circuitry 42 may pre-charge a memory page (e.g., memory cell row 54) by outputting a pre-charge control (e.g., command) signal via a corresponding word line 48 and, subsequently, activate the memory page by outputting an activation (e.g., logic high) control signal via the corresponding word line 48, which causes the switching component of each memory cell 46 in the memory page to electrically couple (e.g., connect) its storage component to a corresponding bit line 52.

Moreover, as in the depicted example, column select circuitry 44 may be coupled to memory cell columns 58 via corresponding amplifier circuitry 50. In other words, as in the depicted example, the column select circuitry 44 may be coupled to the first memory cell column 58A via first bit lines 52A and first amplifier circuitry 50A, the second memory cell column 58B via second bit lines 52B and second amplifier circuitry 50B, the Kth memory cell column 58K via Kth bit lines 52K and Kth amplifier circuitry 50K, and so on. In some embodiments, amplifier circuitry 50 may include a driver amplifier that facilitates storing (e.g., writing) bits into the memory cells 46 and/or a sense amplifier that facilitates outputting (e.g., reading) bits from the memory cells 46.

Additionally, in some embodiments, the column select circuitry 44 may selectively enable access to (e.g., reading from and/or writing to) a storage location in an activated memory page (e.g., memory cell row 54), for example, by outputting a column select (e.g., logic high) control signal to corresponding amplifier circuitry 50. In other words, to read bits (e.g., first bit group 56A) from and/or to write bits to a storage location in the first memory cell column 58A, the column select circuitry 44 may output a column select control signal to the first amplifier circuitry 50A. Similarly, to read bits (e.g., second bit group 56B) from and/or to write bits to a storage location in the second memory cell column 58B, the column select circuitry 44 may output a column select control signal to the second amplifier circuitry 50B. Furthermore, to read data (e.g., Wth bit group 56) from and/or to write bits to a storage location in the Kth memory cell column 58K, the column select circuitry 44 may output a column select control signal to the Kth amplifier circuitry 50K. In this manner, memory cells 46 in one or more memory devices 18 may be organized to implement a memory array 34 in a memory sub-system 14.

Returning to the memory sub-system 14A of FIG. 2, as described above, a memory sub-system 14 may be communicatively coupled to a host sub-system 12 via a memory (e.g., external communication) bus 20, for example, such that processing circuitry 16 in the host sub-system 12 and a memory-side memory controller 32 in the memory sub-system 14 are communicatively coupled to opposite ends of the memory bus 20. Thus, to facilitate communication via the shared memory bus 20A, as in the depicted example, the memory sub-system 14A may include a memory-side bus interface 60 coupled between the shared memory bus 20A and one or more memory-side internal buses 62. In some embodiments, the memory-side bus interface 60 may include input/output (I/O) circuitry and one or more pins, which may each be coupled to a corresponding bit path 28 of the shared memory bus 20A.

In other words, the memory-side bus interface 60 may be implemented and/or operated to facilitate communication of digital signals and, thus, corresponding bits (e.g., command bits and/or data bits) between the shared memory bus 20A and one or more memory-side internal buses 62. For example, the memory-side bus interface 60 may facilitate communicating a first one or more data signals 64A and, thus, corresponding data bits between the first memory device 18A and the shared memory bus 20A. Additionally or alternatively, the memory-side bus interface 60 may facilitate communicating an Mth one or more data signals 64M and, thus, corresponding data bits between the Mth memory device 18M and the shared memory bus 20A. Furthermore, the memory-side bus interface 60 may additionally or alternatively facilitate communicating one or more command signals 66 and, thus, corresponding command bits between the memory-side memory controller 32 and the shared memory bus 20A.

In any case, as described above, communication via a memory (e.g., external communication) bus 20, such as a shared memory bus 20A, may generally be governed by a memory bus clock signal 68 generated and/or output from a memory bus clock 30, for example, implemented in the memory-side memory controller 32. However, as described above, in some embodiments, the frequency of the memory bus clock signal 68 may differ from the frequency of one or more memory device clock signals 40 used in the memory sub-system 14. Moreover, as described above, the frequency of memory bus clock signal 68 used by different memory type memory devices 18 may also differ.

To facilitate accounting for clock frequency differences, as described above, the memory sub-system 14A may include clock frequency conversion circuitry 38, for example, implemented in the memory-side bus interface 60. In particular, as will be described in more detail below, the clock frequency conversion circuitry 38 may be implemented and/or operated to convert digital signals between the memory bus clock frequency and one or more memory device clock frequency. To facilitate converting between different clock frequencies, as in the depicted example, the clock frequency conversion circuitry 38 may include and/or utilize one or more clock frequency conversion factors 70. As in the depicted example, in some embodiments, the clock frequency conversion factors 70 may include one or more performance mode clock frequency conversion factors 70, which may be utilized while in the performance mode to facilitate converting between a target performance mode memory bus clock frequency and corresponding memory device clock frequencies. Additionally or alternatively, the clock frequency conversion factors 70 may include one or more efficiency mode clock frequency conversion factors 70B, which may be utilized while in the efficiency mode to facilitate converting between a target efficiency mode memory bus clock frequency and corresponding memory device clock frequencies.

As such, in some embodiments, a clock frequency conversion factor 70, which is to be used to convert between the frequency of a memory bus clock signal and the frequency of a memory device clock signal used by memory devices of a specific memory type, may be set based on a ratio of the memory bus clock frequency to the memory device clock frequency used by the memory devices 18 of the specific memory type. In fact, since memory device clock frequency used by memory devices 18 of different memory types may differ, in some embodiments, the clock frequency conversion circuitry 38 may selectively utilize different clock frequency conversion factors 70 depending on the memory type of a memory device 18 with which communication is targeted. Accordingly, as will be described in more detail below, implementing a memory sub-system 14 in a computing system 10 in this manner may enable memory device 18 of multiple different memory types in the memory sub-system 14, which are subject to different timing constraints and/or utilize different memory device clock frequencies, to share a memory bus 20 without conflicts occurring at the shared memory bus 20A, which, at least in some instances, may facilitate improving operational efficiency and/or operational reliability of the computing system 10.

However, it should again be appreciated that the depicted example is merely intended to be illustrative and not limiting. For example, in some embodiments, a memory sub-system 14 may additionally include one or more pre-fetch buffers and/or one or more memory-side caches. Furthermore, in some embodiments, a memory bus clock 30 may additionally or alternatively be implemented in a host sub-system 12, for example, in its host-side memory controller 26.

Figure 4:
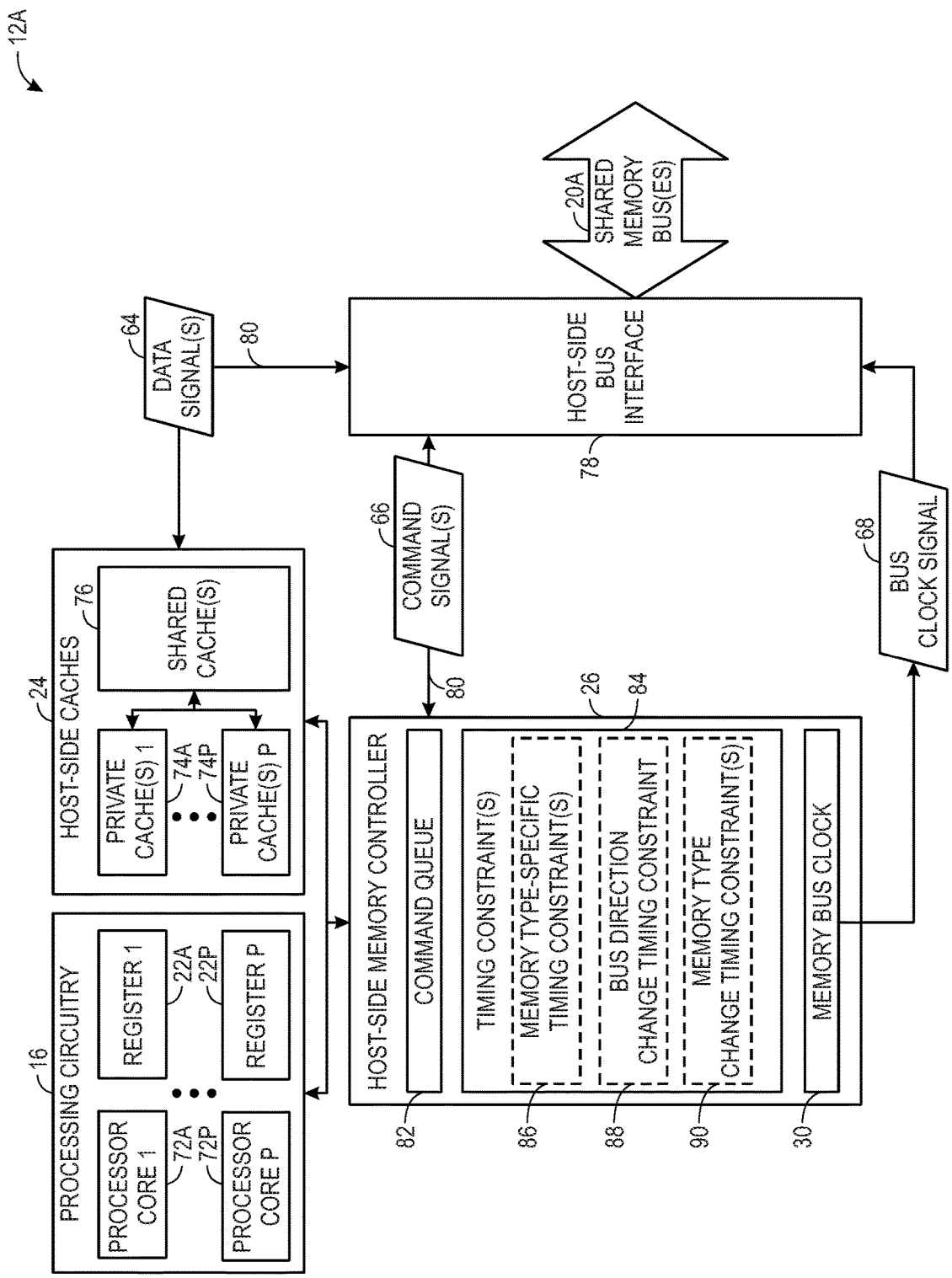
FIG. 4 is a block diagram of an example of the host sub-system of FIG. 1, in accordance with an embodiment of the present disclosure.

To help illustrate, an example of a host sub-system 12A, which is coupled to one or more shared memory buses 20A, is shown in FIG. 4. As described above, in some embodiments, processing circuitry 16 of a host sub-system 12 may be implemented using one or more processor cores 72. For example, the processing circuitry 16 in the host sub-system 12A may include at least a first processor core 72A and a Pth processor core 72P. However, it should appreciated that the depicted example is merely intended to be illustrative and not limiting. For example, in other embodiments, a host sub-system 12 may include a single processor core 72 or more than two (e.g., four, eight, or sixteen) processor cores 72.

Additionally, as described above, in some embodiments, a host sub-system 12 may include one or more registers 22, which provide storage locations directly accessible to its processing circuitry 16. For example, the host sub-system 12A may include a first register 22A, which provides a storage location directly accessible to the first processor core 72A, and a Pth register 22P, which provides a storage location directly accessible to the Pth processor core 72P. To facilitate increasing storage capacity provided on the host-side of the shared memory bus 20A, as described above, a host sub-system 12 may include one or more host-side caches 24. In some embodiments, a host-side cache 24 may be implemented using volatile memory, such as static random-access memory (SRAM) and/or dynamic random-access memory (DRAM).

Furthermore, in some embodiments, the host-side caches 24 may be organized to implement one or more hierarchical memory (e.g., cache and/or buffer) levels. For example, the host-side caches 24 may include private host-side caches 74, which are used to implement one or more host-side lower (e.g., lowest) memory levels, and a shared host-side cache 76, which may be used to implement a host-side higher (e.g., intermediate) memory level. In some embodiments, the data storage provided by the shared host-side cache 76 may be shared by at least the first processor core 72A and the Pth processor core 72P. For example, the shared host-side cache 76 may include one or more level three (L3) host-side caches 24A.

On the other hand, in some embodiments, the data storage provided by a private host-side cache 74 may be dedicated to a corresponding processor core 72. For example, a first one or more private host-side caches 74A may include a level one (L1) host-side cache 24A dedicated to the first processor core 72A and a level two (L2) host-side cache 24A cache dedicated to the first processor core 72A. Additionally or alternatively, a Pth one or more private host-side caches 74P may include a level one (L1) host-side cache 24A dedicated to the Pth processor core 72P and a level two (L2) host-side cache 24A dedicated to the Pth processor core 72P.

In any case, as described above, a host sub-system 12 may be communicatively coupled to a memory sub-system 14 via a memory (e.g., external communication) bus 20, for example, such that processing circuitry 16 in the host sub-system 12 and a memory-side memory controller 32 in the memory sub-system 14 are communicatively coupled to opposite ends of the memory bus 20. Thus, to facilitate communication via the shared memory bus 20A, as in the depicted example, the host sub-system 12A may include a host-side bus interface 78 coupled between the shared memory bus 20A and one or more host-side internal buses 80. In some embodiments, the host-side bus interface 78 may include input/output (I/O) circuitry and one or more pins, which may each be coupled to a corresponding bit path 28 of the shared memory bus 20A.

In other words, the host-side bus interface 78 may be implemented and/or operated to facilitate communication of digital signals and, thus, corresponding bits (e.g., command bits and/or data bits) between the shared memory bus 20A and one or more host-side internal buses 80. For example, the host-side bus interface 78 may facilitate communicating one or more data signals 64 and, thus, corresponding data bits between the host-side caches 24 and the shared memory bus 20A. Additionally or alternatively, the host-side bus interface 78 may facilitate communicating one or more command (e.g., request or control) signals 66 between a command queue 82 of a host-side memory controller 26 and the shared memory bus 20A.

In any case, as described above, communication via a memory (e.g., external communication) bus 20, such as a shared memory bus 20A, may generally be governed by a memory bus clock signal 68 generated and/or output from a memory bus clock 30. As in the depicted example, in some embodiments, the memory bus clock 30 may be implemented in the host sub-system 12A, for example, in its host-side memory controller 26. When a separate memory bus clock 30 is not implemented in a memory sub-system 14, in such embodiments, the host sub-system 12A may transmit the memory bus clock signal 68 to the memory sub-system 14, for example, via the shared memory bus 20A and/or a dedicated bit path 28. Conversely, when a separate memory bus clock 30 is not implemented in the host sub-system 12, the memory sub-system 14 may transmit the memory bus clock signal 68 to the host sub-system 12, for example, via the shared memory bus 20A and/or a dedicated bit path 28.

However, as described above, communication via a shared memory bus 20A and fulfillment of a memory access command are generally non-instantaneous. In fact, at least in some instances, the non-instantaneous nature may result in conflicts at the shared memory bus 20A that potentially affect (e.g., reduce) operational efficiency and/or operational reliability of a computing system, for example, due to a conflict corrupting data transmitted via the shared memory bus 20A and/or delaying return (e.g., transmission) of data retrieved from the memory sub-system 14. To facilitate elimination of conflicts occurring at the shared memory bus 20A, one or more timing constraints 84 may be enforced on communication via the shared memory bus 20A.

As described above, in some embodiments, different memory type memory devices 18 may be subject to one or more different timing constraints 84. Thus, in such embodiments, the timing constraints 84 may include one or more sets of memory type-specific timing constraints 86, for example, which each corresponds with a different memory type implemented in the memory sub-system 14. Merely as an illustrative non-limiting example, the timing constraints 84 may include a first set of memory type-specific timing constraints 86 associated with a first memory type of a first memory device 18A in the memory sub-system 14, an Mth set of memory type-specific timing constraints 86 associated with an Mth memory type of an Mth memory device 18M in the memory sub-system 14, and so on.

In addition to memory type-specific timing constraints 86, the timing constraints 84 may include a memory bus direction change timing constraint 88, which is to be enforced (e.g., introduced) immediately before the communication direction on the shared memory bus 20A is expected to change. As described above, in some embodiments, the memory bus direction change timing constraint 88 may be enforced in response to an expected change in communication direction on the shared memory bus 20A regardless of whether the computing system 10 is operating in the performance mode or the efficiency mode. In other words, in such embodiments, the target duration of the memory bus direction change timing constraint 88 may be an operational parameter of the performance mode, the efficiency mode, or both (e.g., common or global operational parameter).

Additionally, in some embodiments, the timing constraints 84 may include one or more memory type change timing constraints 90, which are to be enforced (e.g., introduced) by the computing system 10 while operating in the efficiency mode. For example, the one or more memory type change timing constraints 90 may include a first memory type-to-second memory type timing constraint 90, which is to be enforced (e.g., introduced) immediately before the shared memory bus 20A is expected to change from communication with a memory device 18 of the first memory type to communication with another memory device 18 of the second memory type. Additionally or alternatively, the one or more memory type change timing constraints 90 may include a second memory type-to-first memory type timing constrain 90, which is to be enforced immediately before the shared memory bus 20A is expected to change from communication with a memory device 18 of the second memory type to communication with another memory device 18 of the first memory type. In other words, in such embodiments, the target duration of a memory type change timing constraints 84 may be an operational parameter of the efficiency mode. In fact, in some embodiments, a computing system 10 may selectively (e.g., adaptively) switch between operating in the performance mode and operating in the efficiency mode, for example, based at least in part on target operating characteristics, such as target power consumption and/or target memory latency, of the computing system 10.

Figure 5:
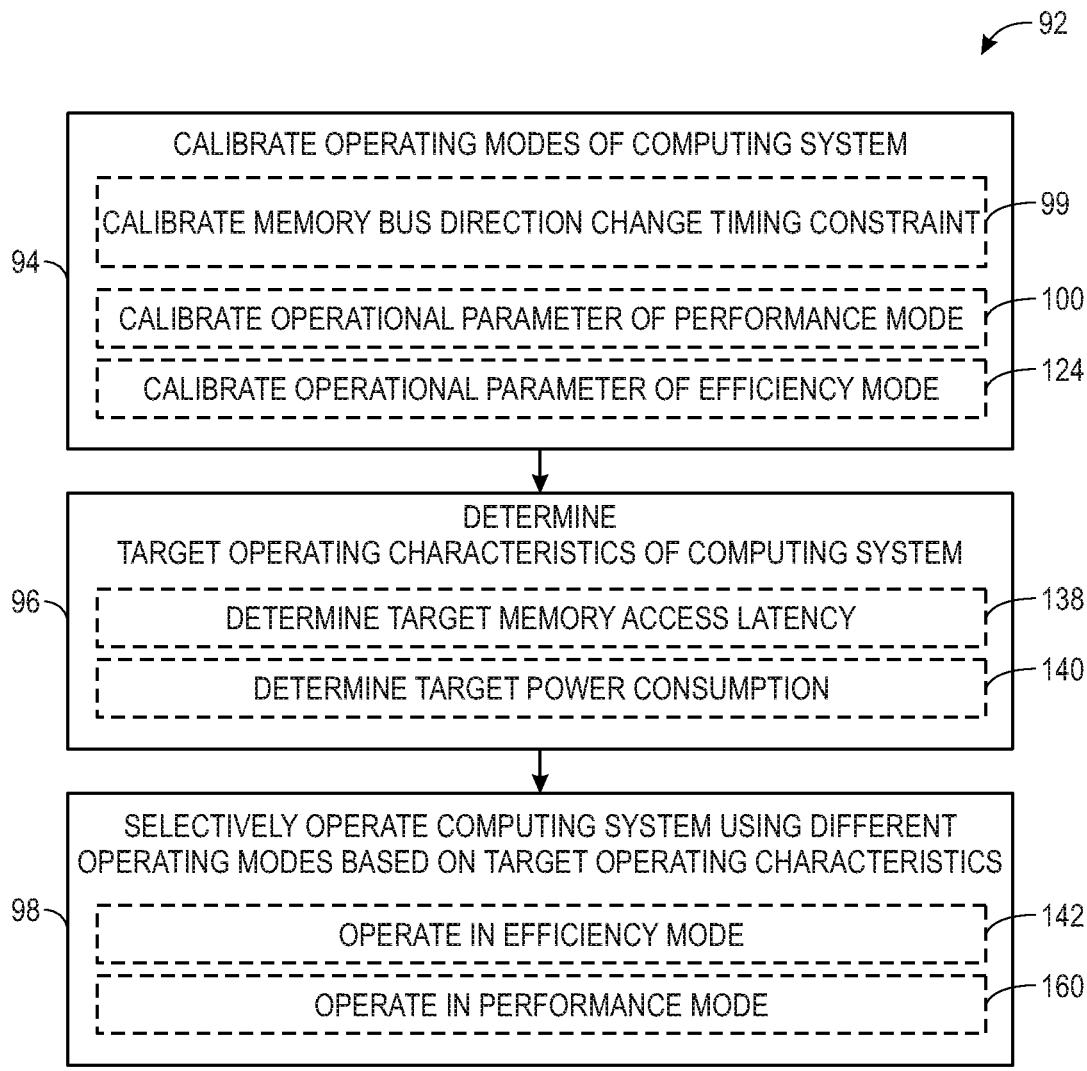
FIG. 5 is a flow diagram of an example process for operating the computing system of FIG. 1, in accordance with an embodiment of the present disclosure.

To help illustrate, an example of a process 92 for operating a computing system 10 is described in FIG. 5. Generally, the process 92 includes calibrating operating modes of a computing system (process block 94). Additionally, the process 92 includes determine target operating characteristics of the computing system (process block 96) and selectively operating the computing system using different operating modes based on the target operating characteristics (process block 98).

Although described in a particular order, which represents a particular embodiment, it should be noted that the process 92 may be performed in any suitable order. Additionally, embodiments of the process 92 may omit process blocks and/or include additional process blocks. Furthermore, in some embodiments, the process 92 may be implemented at least in part by executing instructions stored in a tangible, non-transitory, computer-readable medium, such as memory implemented in a memory controller (e.g., host-side memory controller 26 and/or memory-side memory controller 32), using processing circuitry, such as a processor implemented in the memory controller. Moreover, in some embodiments, the process 92 may include a calibration (e.g., design or tuning) process, for example, performed at least in part by a calibration system (e.g., one or more calibration devices) offline and/or before commercial deployment of the computing system 10.

In particular, the calibration process may include calibrating operating modes of a computing system 10 (process block 94). As described above, in some embodiments, a memory bus direction change timing constraint 88 may be an operational parameter common between multiple different operating modes of the computing system 10. Thus, in some embodiments, calibrating the operating modes of the computing system 10 may include calibrating a memory bus direction change timing constraint 86 (process block 99).

As described above, a memory bus direction change timing constraint 88 may be enforced to facilitate elimination of conflicts occurring at a shared memory bus 20A by accounting for the non-instantaneous nature of communication via the shared memory bus 20A, for example, due to digital (e.g., electrical and/or optical) signals generally propagating non-instantaneously and/or switching (e.g., gating) of input/output (I/O) circuitry in a bus interface (e.g., memory-side bus interface 60 and/or host-side bus interface 78) between its transmission state (e.g., mode) and its reception state occurring non-instantaneously. Merely as an illustrative non-limiting example, to facilitate accounting for non-instantaneous propagation of digital signals on the shared memory bus 20A, the calibration process may set the target duration of the memory bus direction change timing constraint 86 to match the duration of a single clock cycle of a memory bus clock signal 68. Additionally or alternatively, the calibration process may set the target duration of the memory bus direction change timing constraint 86 to match an expected duration for switching (e.g., gating) input/output (I/O) circuitry in a memory-side bus interface 60 and/or a host-side bus interface 78 between its transmission state and its reception state.

Furthermore, as described above, in some embodiments, the selectively implemented operating modes of a computing system 10 may include a performance mode. Thus, in such embodiments, calibrating the operating modes of the computing system 10 may include calibrating one or more operational parameters of the performance mode (process block 100). As described above, in some embodiments, the operational parameters of the performance mode may include a target performance mode memory bus clock frequency, a target performance mode memory bus communication cycle duration, a target performance mode memory bus communication cycle bandwidth, a target allocation of a memory bus communication cycle between each of multiple different memory types, one or more performance mode clock frequency conversion factors 70A, or any combination thereof.

Figure 6:
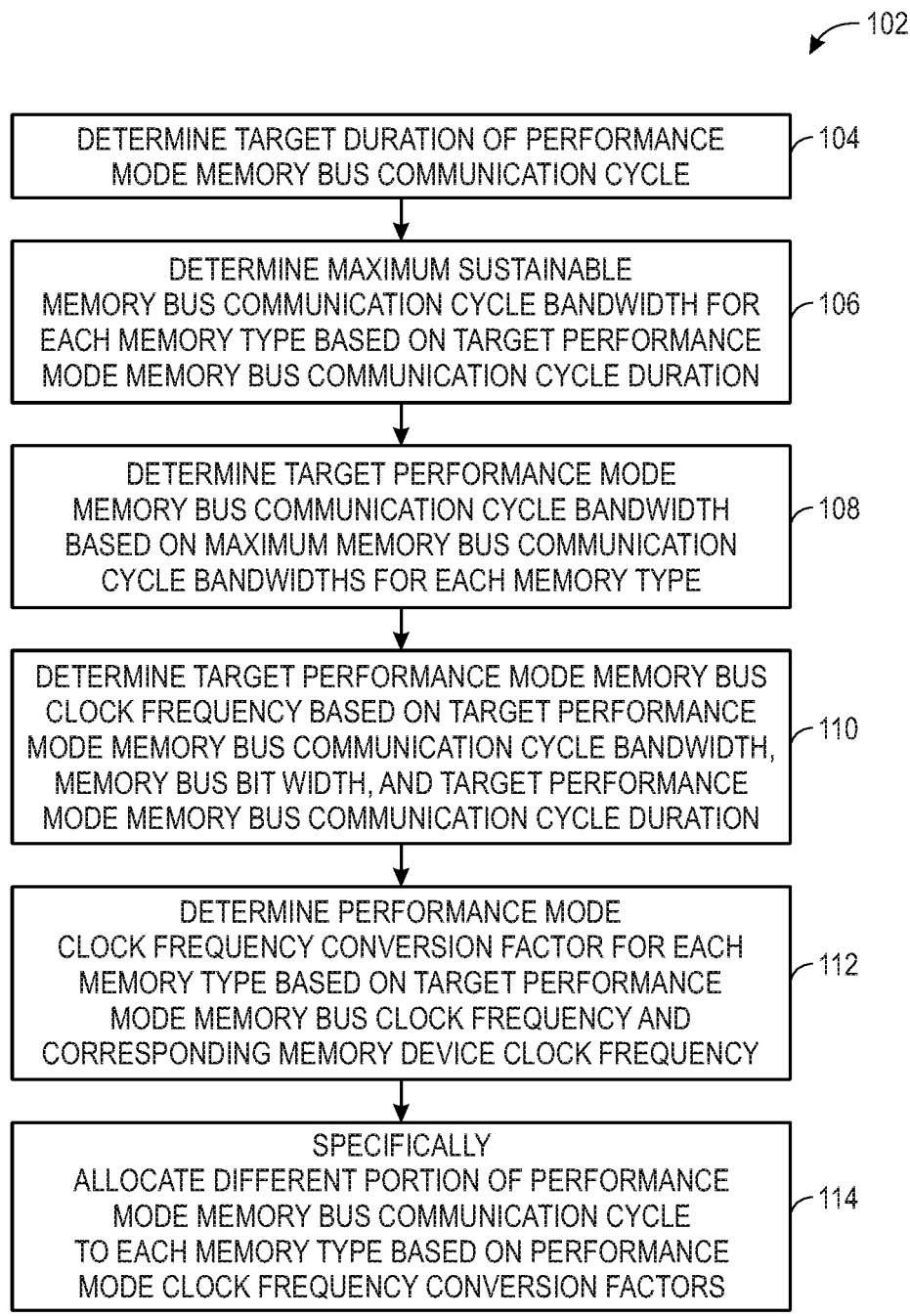
FIG. 6 is a flow diagram of an example calibration process for setting (e.g., determining, calibrating, tuning, and/or designing) operational parameters of a performance mode for the computing system of FIG. 1, in accordance with an embodiment of the present disclosure.

To help illustrate, an example of a process 102 for calibrating (e.g., designing and/or tuning) operational parameters of a performance mode is described in FIG. 6. Generally, the performance mode calibration process 102 includes determining a target duration of a memory bus communication cycle (process block 104), determining a maximum sustainable memory bus communication cycle bandwidth for each memory type based on the target memory bus communication cycle duration (process block 106), and determining a target performance mode memory bus communication cycle bandwidth based on the maximum sustainable memory bus communication cycle bandwidth for each memory type (process block 108). Additionally, the performance mode calibration process 102 includes determining a target performance mode memory bus clock frequency based on the target performance mode memory bus communication cycle bandwidth, memory bus bit width, and the target memory bus communication cycle duration (process block 110), determining a performance mode clock frequency conversion factor for each memory type based on the target performance memory bus clock frequency and a corresponding memory device clock frequency (process block 112), and specifically allocating a different portion of a memory bus communication cycle to each memory type based on the performance mode clock frequency conversion factors (process block 114).

Although described in a particular order, which represents a particular embodiment, it should be noted that the performance mode calibration process 102 may be performed in any suitable order. Additionally, embodiments of the performance mode calibration process 102 may omit process blocks and/or include additional process blocks. Furthermore, in some embodiments, the performance mode calibration process 102 may be implemented at least in part by executing instructions stored in a tangible, non-transitory, computer-readable medium, such as memory implemented in a calibration system (e.g., one or more calibration devices), using processing circuitry, such as one or more processors implemented in the calibration system.

Accordingly, in some embodiments, a calibration system may determine a target duration (e.g., period) of a performance mode communication cycle for a shared memory bus 20A deployed or to be deployed in a computing system 10 (process block 104). In fact, in some embodiments, the calibration system may include at least a portion of the computing system 10 being calibrated. Additionally, in some embodiments, the calibration system may determine the target duration of a performance mode communication cycle based at least in part on the duration of memory device clock signals used or to be used by different memory types implemented in a memory sub-system 14 of the computing system 10.

Figure 7:
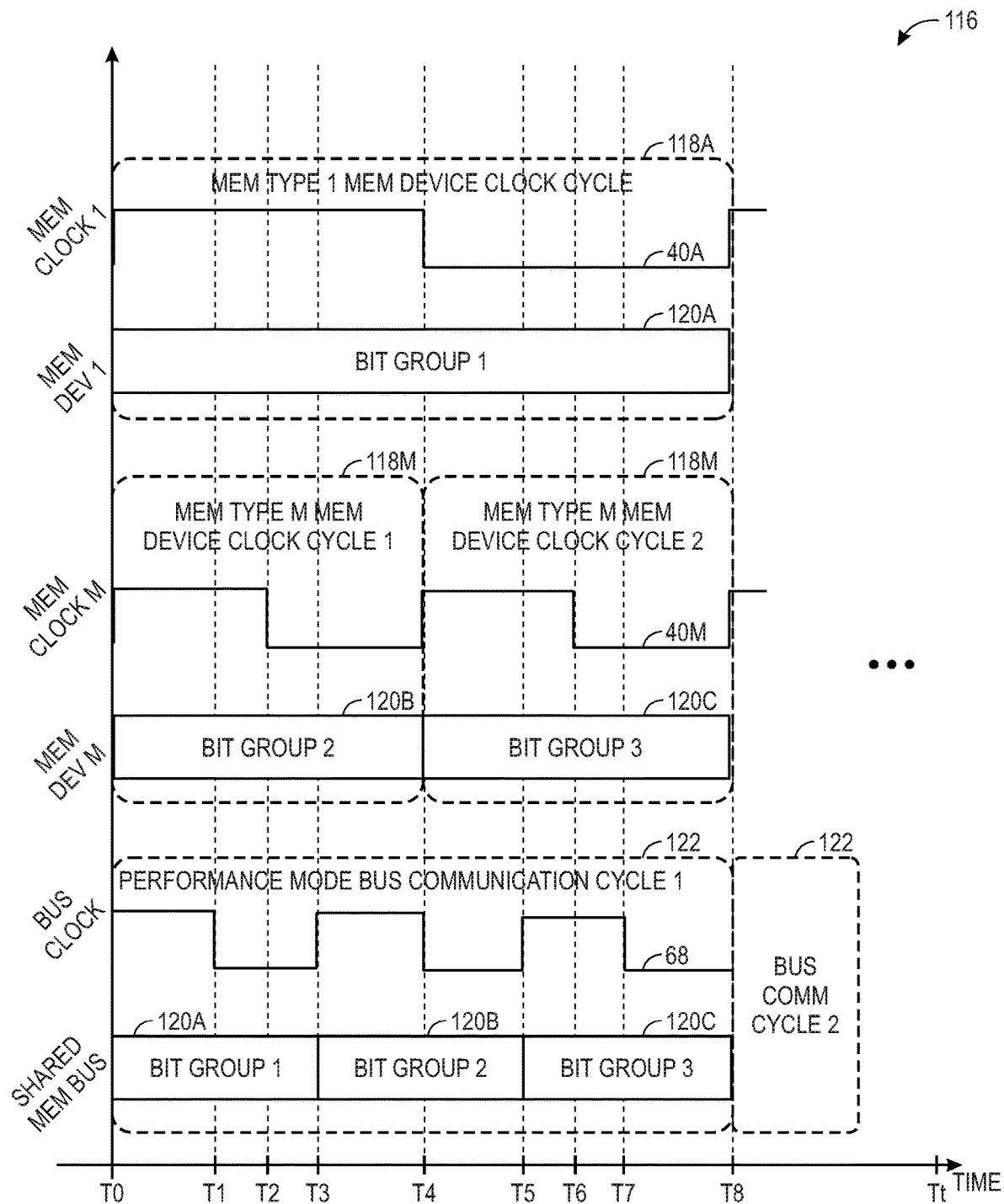
FIG. 7 is a timing diagram of example performance mode operation of the computing system of FIG. 1 based on operational parameters set using the performance mode calibration process of FIG. 6, in accordance with an embodiment of the present disclosure.

To help illustrate, an example timing diagram 116 describing operation of a computing system 10 using properly calibrated performance mode operational parameters is shown in FIG. 7. In particular, the performance mode timing diagram 116 describes operation of a first memory device 18A of a first memory type, an Mth memory device 18M of an Mth (e.g., different) memory type, and a shared memory bus 20A from time T0 to time Tt. As depicted, a first memory device clock signal 40A, which governs operation of the first memory device 18A, transitions to its logic high state at time T0, transitions to its logic low state at time T4, and transitions back to its logic high state at time T8 and, thus, the duration of a clock cycle 118A of the first memory device clock signal 40A is the duration between time T0 and time T8. Additionally, as depicted, a first bit group 120A is communicated with the first memory device 18A during a clock cycle 118A of the first memory device clock signal 40A.

However, as depicted, an Mth memory device clock signal 40M, which governs operation of the Mth memory device 18M, differs from the first memory device clock signal 40A. In particular, as depicted, the Mth memory device clock signal 40M transitions to its logic high state at time T0, transitions to its logic low state at time T2, and transitions back to its logic high state at time T4. Additionally, as depicted, the Mth memory device clock signal 40M transitions back to its logic high state at time T4, transitions to its logic low state at time T6, and transitions back to its logic high state at time T8. In other words, the duration of a clock cycle 118M of the Mth memory device clock signal 40M is the duration between time T0 and time T4 and/or the duration between time T4 and time T8. Furthermore, as depicted, a second bit group 120B is communicated with the Mth memory device 18M during a first clock cycle 118M of the Mth memory device clock signal 40M and a third bit group 120C is communicated with the Mth memory device 18M during a second clock cycle 118M of the Mth memory device clock signal 40M.

Moreover, as depicted, the duration of a performance mode communication cycle 122 of the shared memory bus 20A is set to match the duration of a clock cycle 118A of the first memory device clock signal 40A and, thus, overlaps with two clock cycles 118M of the Mth memory device clock signal 40M. However, it should be appreciated that the depicted example is merely intended to be illustrative and not limiting. For example, more generally, a calibration system may set the target performance mode memory bus clock cycle duration as a least common multiple of the memory device clock cycle durations of the memory device clock signals used in the memory sub-system 14. As such, in other embodiments, the duration of a performance mode memory bus communication cycle 122 may differ from the memory device clock cycle durations of each memory device clock signal 40 used in a memory sub-system 14.

Returning to the performance mode calibration process 102 of FIG. 6, the calibration system may then determine a maximum communication bandwidth sustainable by each memory type in the memory sub-system 14 during a memory bus communication cycle that has the target performance mode memory bus clock cycle duration (process block 106). To facilitate determining the maximum sustainable memory bus communication cycle bandwidth associated with a specific memory, in some embodiments, the calibration system may determine the bit width (e.g., number of parallel bit paths 28) of the shared memory bus 20A and the maximum number of clock cycles of a memory device clock signal 40 used by one or more memory device 18 of the specific memory type that can occur during a time period that matches the target performance mode memory bus clock cycle duration. For example, the calibration system may determine the maximum sustainable memory bus communication cycle bandwidth associated with a specific memory type by multiplying the bit width of the shared memory bus 20A with a corresponding maximum number of memory device clock cycles that can occur during a performance mode memory bus communication cycle 122 having the target performance mode memory bus clock cycle duration.

To help illustrate, with regard to the example performance mode timing diagram 116 of FIG. 7, the calibration system may determine that one clock cycle 118A of the first memory device clock signal 40A can occur during the target duration of the performance mode memory bus communication cycle 122. As such, the calibration system may determine that the maximum sustainable memory bus communication cycle bandwidth associated with the first memory type matches the bit width of the shared memory bus 20A. On the other hand, the calibration system may determine that two clock cycles 118M of the Mth memory device clock signal 40M can occur during the target duration of the performance mode memory bus communication cycle 122. As such, the calibration system may determine that the maximum memory bus communication cycle bandwidth associated with the Mth memory type is twice the bit width of the shared memory bus 20A.

Returning to the performance mode calibration process 102 of FIG. 6, based at least in part on the maximum sustainable memory bus communication cycle bandwidths associated with each of the memory types in the memory sub-system 14, the calibration system may determine a target bandwidth to be provided by the shared memory bus 20A during a performance mode memory bus communication cycle (process block 108). For example, the calibration system may determine the target performance mode memory bus communication cycle bandwidth to be provided by the shared memory bus 20A by summing together the maximum sustainable memory bus communication cycle bandwidths associated with each of the different memory types. In other words, with regard to the example performance mode timing diagram 116 of FIG. 7, the calibration system may determine that the target performance mode memory bus communication cycle bandwidth is three times the bit width of the shared memory bus 20A.

Returning to the performance mode calibration process 102 of FIG. 6, the calibration system may then determine a target frequency of a memory bus clock signal 68 to be used while operating in the performance mode based on the target performance mode memory bus communication cycle bandwidth, the bit width of the shared memory bus 20A, and the target performance mode memory bus clock cycle duration (process block 110). For example, the calibration system may determine the target performance mode memory bus clock frequency by dividing the target performance mode memory bus communication cycle bandwidth by the bit width of the shared memory bus 20A and the target performance mode memory bus communication cycle duration. As depicted in the example performance mode timing diagram 116 of FIG. 7, determining the target performance mode memory bus communication cycle duration in this manner results in the performance mode memory bus clock frequency being three times the frequency of the first memory device clock signal 40A and one and a half times the frequency of the Mth memory device clock signal 40M, which, at least in some instances, may facilitate reducing data retrieval latency and, thus, operational efficiency, for example, compared to an operating mode that targets a lower memory bus clock frequency.

Based at least in part on the target performance mode memory bus clock frequency and frequencies of corresponding memory device clock signals 40, returning to the performance mode calibration process 102 of FIG. 6, the calibration system may determine a performance mode clock frequency conversion factor 70A associated with each of the different memory types in the memory sub-system 14 (process block 112). In particular, in some embodiments, the calibration system may set a performance mode clock frequency conversion factor 70A associated with a specific memory type as a ratio of the target performance mode memory bus clock frequency to the frequency of a memory device clock signal 40 used by a memory device 18 of the specific memory type. For example, with regard to the example performance mode timing diagram 116 of FIG. 7, a first performance mode clock frequency conversion factor 70 associated with the first memory type may have a value of three while an Mth performance mode clock frequency conversion factor 70 associated with the Mth memory type may have a value of one and a half.

Returning to the performance mode calibration process 102 of FIG. 6, based at least in part on the performance mode clock frequency conversion factors 70, the calibration system may allocate a different portion (e.g., time period) of a performance mode memory bus communication cycle 122 for communication with different memory types in the memory sub-system 14. For example, with regard to the example performance mode timing diagram 116 of FIG. 7, the duration of the portion of the performance mode memory bus communication cycle 122 allocated for communication with the first memory type is half the duration of the portion of the performance mode memory bus communication cycle 122 allocated for communication with the Mth memory type since the first performance mode clock frequency conversion factor 70 associated with the first memory type has a value of three and the Mth performance mode clock frequency conversion factor 70 associated with the Mth memory type has a value of one and a half. In particular, as depicted, the duration of the portion of the performance mode memory bus communication cycle 122 allocated for communication with the first memory type spans from time T0 to time T3 while the duration of the portion of the performance mode memory bus communication cycle 122 allocated for communication with the Mth memory type spans from time T3 to time T8. In this manner, one or more operational parameters of the performance mode of a computing system 10 may be calibrated (e.g., set, tuned, and/or designed) to facilitate improving (e.g., reducing) data access latency provided by its memory sub-system 14 while eliminating conflicts occurring at a shared memory bus 20A coupled between the memory sub-system 14 and its host (e.g., processing) sub-system 12, which, at least in some instances may facilitate improving operational efficiency and/or operational reliability of the computing system 10.

However, it should again be appreciated that the depicted example is merely intended to be illustrative and not limiting. In particular, in other embodiments, the order with which portions of a performance mode memory bus communication cycle 122 are allocated for communication with different memory types may differ. For example, with regard to the example performance mode timing diagram 116 of FIG. 7, the portion of the performance mode memory bus communication cycle 122 allocated for communication with the Mth memory type may instead span from time T0 to time T5 while the portion of the performance mode memory bus communication cycle 122 allocated for communication with the first memory type spans from T5 to T8.

Returning to the process 92 of FIG. 5, as described above, the computing system 10 may include an efficiency mode in addition to the performance mode. Thus, in some embodiments, calibrating the operating modes of the computing system 10 may include calibrating one or more operational parameters of the efficiency mode (process block 100). As described above, in some embodiments, the operational parameters of the efficiency mode may include a target efficiency memory bus clock frequency, one or more efficiency mode clock frequency conversion factors 70B, one or more memory type change timing constraints 90, or any combination thereof.

Figure 8:
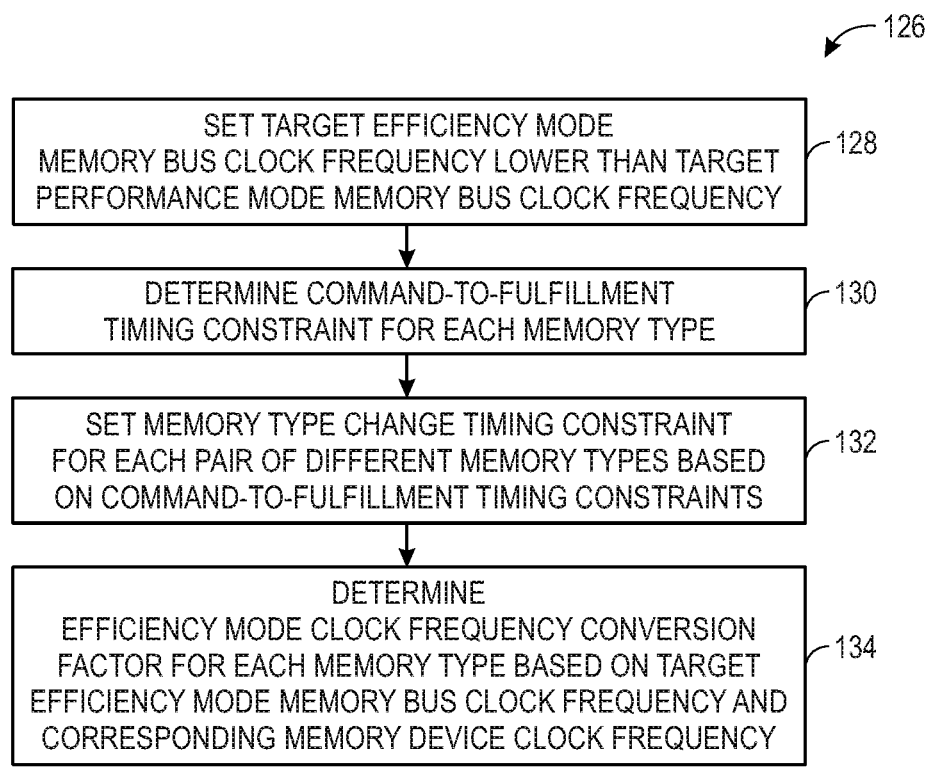
FIG. 8 is a flow diagram of an example calibration process for setting (e.g., determining, calibrating, tuning, and/or designing) operational parameters of an efficiency mode for the computing system of FIG. 1, in accordance with an embodiment of the present disclosure.

To help illustrate, an example of a process 126 for calibrating (e.g., designing and/or tuning) operational parameters of a performance mode is described in FIG. 8. Generally, the efficiency mode calibration process 126 includes setting a target efficiency mode memory bus clock frequency lower than a target performance mode memory bus clock frequency (process block 128) and determining a command-to-fulfillment timing constraint for each memory type (process block 130). Additionally, the efficiency mode calibration process 126 includes setting a memory type change timing constraint for each pair of different memory types based on the command-to-fulfillment timing constraints (process block 132) and determining an efficiency mode clock frequency conversion factor for each memory type based on a corresponding memory device clock frequency and the target efficiency mode memory bus clock frequency (process block 134).

Although described in a particular order, which represents a particular embodiment, it should be noted that the efficiency mode calibration process 126 may be performed in any suitable order. Additionally, embodiments of the efficiency mode calibration process 126 may omit process blocks and/or include additional process blocks. Furthermore, in some embodiments, the efficiency mode calibration process 126 may be implemented at least in part by executing instructions stored in a tangible, non-transitory, computer-readable medium, such as memory implemented in a calibration system (e.g., one or more calibration devices), using processing circuitry, such as one or more processors implemented in the calibration system.

Accordingly, in some embodiments, a calibration system may determine a target frequency of a memory bus clock signal 68 to be used for communicating via a shared memory bus 20A deployed or to be deployed in a computing system 10 while the computing system 10 is operating in the efficiency mode. As described above, in some embodiments, the calibration system may include at least a portion of the computing system 10 being calibrated. Additionally, as described above, power consumption of a computing system 10 generally varies with the frequency of a clock signal, such as a memory bus clock signal 68, that governs its operation.

Thus, to facilitate reducing power consumption, the calibration system may set the target efficiency mode memory bus clock frequency lower than a target frequency of a memory bus clock signal 68 to be used while operating in the performance mode (process block 128). In fact, in some embodiments, the calibration system may set the target efficiency mode memory bus clock frequency to match the frequency of a memory device clock signal 40 used in a memory sub-system 14 of the computing system 10. For example, the calibration system may set the target efficiency mode memory bus clock frequency to match the highest (e.g., fastest) memory device clock frequency used in the memory sub-system 14.

Figure 9:
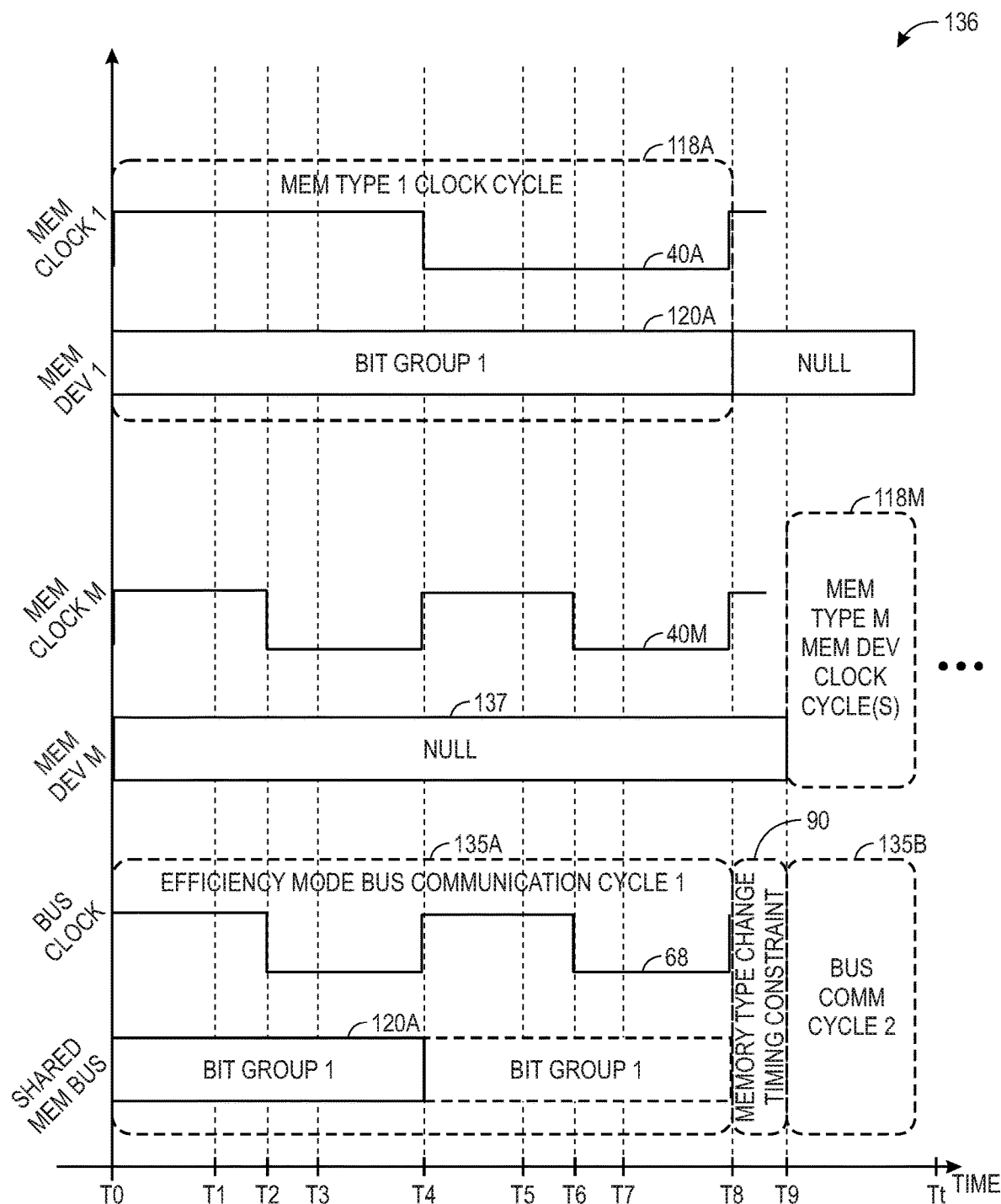
FIG. 9 is a timing diagram of example efficiency mode operation of the computing system of FIG. 1 based on operational parameters set using the efficiency mode calibration process of FIG. 8, in accordance with an embodiment of the present disclosure.

To help illustrate, an example timing diagram 136 describing operation of a computing system 10 using properly calibrated efficiency mode operational parameters is shown in FIG. 9. Merely for illustrative purposes, similar to the performance mode timing diagram 116 of FIG. 7, the efficiency mode timing diagram 136 of FIG. 9 describes operation of a first memory device 18A of a first memory type, an Mth memory device 18M of an Mth (e.g., different) memory type, and a shared memory bus 20A from time T0 to time Tt. In particular, similar to the performance mode timing diagram 116 of FIG. 7, as depicted in the efficiency mode timing diagram 136 of FIG. 9, a first memory device clock signal 40A, which governs operation of the first memory device 18A, transitions to its logic high state at time T0, transitions to its logic low state at time T4, and transitions back to its logic high state at time T8 and, thus, the duration of a clock cycle 118A of the first memory device clock signal 40A is the duration between time T0 and time T8.

Additionally, similar to the performance mode timing diagram 116 of FIG. 7, as depicted in the efficiency mode timing diagram 136 of FIG. 9, the Mth memory device clock signal 40M transitions to its logic high state at time T0, transitions to its logic low state at time T2, transitions back to its logic high state at time T4, transitions to its logic high state at time T4, transitions to its logic low state at time T6, and transitions back to its logic high state at time T8. In other words, as in the performance mode timing diagram 116 of FIG. 7, the duration of a clock cycle 118M of the Mth memory device clock signal 40M described in the efficiency mode timing diagram 136 of FIG. 9 has a duration (e.g., period) that matches the duration between time T0 and time T4 and/or the duration between time T4 and time T8. Moreover, similar to the performance mode timing diagram 116 of FIG. 7, as depicted in the efficiency mode timing diagram 136 of FIG. 9, a first bit group 120A is communicated with the first memory device 18A during a clock cycle 118A of the first memory device clock signal 40A that overlaps with a first efficiency mode memory bus communication cycle 135A of the shared memory bus 20A.

However, instead of valid bit groups 120, as depicted in the efficiency mode timing diagram 136 of FIG. 9, null bits 135 are communicated with the Mth memory device 18 during the clock cycles 118M of the Mth memory device clock signal 40M that overlap with the first efficiency mode memory bus communication cycle 135A of the shared memory bus 20A. That is, the first efficiency mode memory bus communication cycle 135A may be used for communication with memory device 18 of the first memory type, but not memory devices 18 of the Mth memory type. In other words, the first efficiency mode memory bus communication cycle 135A may be dedicated to communication with memory devices 18 of the first memory type and, thus, considered a first memory type efficiency mode memory bus communication cycle 135A. Nevertheless, as depicted in the efficiency mode timing diagram 136 of FIG. 9, the frequency of a memory bus clock signal 68 that governs communication via the shared memory bus 20A is set to match the frequency of the Mth memory device clock signal 40M, for example, since the frequency of the Mth memory device clock signal 40M is greater than the frequency of the first memory device clock signal 40A that governs operation of memory devices 18 of the first memory type.

However, it should be appreciated that the depicted example is merely intended to be illustrative and not limiting. In particular, as will be described in more detail below with regard to the efficiency mode timing diagram 136 of FIG. 9, communication via the shared memory bus 20A is changed from communication with one or more memory devices 18 of the first memory type during the first memory bus communication cycle 122A to communication with one or more memory devices 18 of the Mth memory type during a second (e.g., different and/or subsequent) memory bus communication cycle 135B. However, instead of switching to communication with a memory device 18 of the Mth memory type, in other instances, the shared memory bus 20A may continue to be used for communication with a memory device 18 of the first memory type and, thus, an efficiency mode memory bus communication cycle 135 (e.g., first efficiency mode memory bus communication cycle 135A) dedicated to communication with the first memory type may include multiple clock cycles 118A of the first memory device clock signal 40A. In fact, in some embodiments, different efficiency mode memory bus communication cycles 135 may span differing durations and, thus, overlap with different numbers of memory device clock cycles 118. Additionally, in other embodiments, the target efficiency mode memory bus clock frequency may be set to match the frequency of the first memory device clock signal 40 that governs operation of the first memory device 18A.

Returning to the efficiency mode calibration process 126 of FIG. 8, the calibration system may determine one or more command-to-fulfillment timing constraints 84 for each of the different memory types in the memory sub-system 14 (process block 130). In other words, in some embodiments, the calibration system may determine one or more memory type-specific timing constraints 86 for each of the different memory types in the memory sub-system 14. For example, the one or more command-to-fulfillment timing constraints 84 may include a first read command-to-data return timing constraint 84 specific to memory devices 18 of a first memory type, an Mth (e.g., different) read command-to-data return timing constraint 84 specific to memory devices 18 of an Mth (e.g., different) memory type, and so on. Additionally or alternatively, the one or more command-to-fulfillment timing constraints 84 may include a first write command-to-data storage timing constraint 84 specific to memory devices 18 of the first memory type, an Mth (e.g., different) write command-to-data storage timing constraint 84 specific to memory devices 18 of an Mth (e.g., different) memory type, and so on.

To facilitate elimination of conflicts occurring at the shared memory bus 20A while operating in the efficiency mode, the calibration system may set one or more memory type change timing constraints 90 for each pair of different memory types in the memory sub-system 14 (process block 132). For example, when the memory sub-system 14 includes memory device 18 of the first memory type and memory devices 18 of the Mth memory type, the calibration system may set the duration of a first memory type-to-Mth memory type timing constraint 90, which is to be introduced immediately before communication via the shared memory bus 20A is expected to change from communication with the first memory type to communication with the Mth memory type, to match the duration of a longest command-to-fulfillment timing constraint 84 associated with the first memory type. Additionally, the calibration system may set the duration of an Mth memory type-to-first memory type timing constraint 90, which is to be introduced immediately before communication via the shared memory bus 20A is expected to change from communication with the Mth memory type to communication with the first memory type, to match the duration of a longest command-to-fulfillment timing constraint 84 associated with the Mth memory type.

To help illustrate, with regard to the example efficiency mode timing diagram 136 of FIG. 9, as mentioned above, communication via the shared memory bus 20A is changed from communication with the first memory type during the first efficiency mode memory bus communication cycle 135A to communication with the Mth memory type during the second (e.g., subsequent and/or different) memory bus communication cycle 135B. However, instead of starting the second memory bus communication cycle 122B immediately at time T8, a memory type change (e.g., first memory type-to-Mth memory type) timing constraint 90 is introduced (e.g., enforced) from time T8 to time T9, thereby delaying the second memory bus communication cycle 122B and, thus, communication with the Mth memory type until time T9.

As described above, in some embodiments, the duration of a memory type change timing constraint 90, which is to be introduced immediately before communication is switched from a corresponding memory type to a different memory type, may be set to match the longest command-to-fulfillment timing constraint 84 associated with the corresponding memory type. In other words, in such embodiments, the duration of the longest command-to-fulfillment timing constraint 84 associated with the first memory type of the first memory devices 18A may match the duration between time T8 and time T9. By introducing memory type change timing constraints 90 set (e.g., calibrated) in this manner, the computing system 10 may reduce likelihood that a subsequent memory access request is communicated to a memory device 18 before another memory device 18 of a different memory type completes fulfillment of a previous memory access request and, thus, likelihood of fulfillment of the subsequent memory access command conflicting with fulfillment of the previous memory access command at the shared memory bus 20A.

Returning to the efficiency mode calibration process 126 of FIG. 8, the calibration system may additionally determine an efficiency mode clock frequency conversion factor 70 associated with each of the different memory types in the memory sub-system 14 (process block 112). In particular, in some embodiments, the calibration system may set an efficiency mode clock frequency conversion factor 70B associated with a specific memory type as a ratio of the target efficiency mode memory bus clock frequency to the frequency of a memory device clock signal 40 used by a memory device 18 of the specific memory type. For example, with regard to the example efficiency mode timing diagram 136 of FIG. 9, a first efficiency mode clock frequency conversion factor 70B associated with the first memory type may have a value of two while an Mth efficiency mode clock frequency conversion factor 70B associated with the Mth memory type may have a value of unity (e.g., one). In this manner, one or more operational parameters of an efficiency mode of a computing system 10 may be calibrated (e.g., set, tuned, and/or designed) to facilitate reducing its power consumption as well as elimination of conflicts occurring at a shared memory bus 20A coupled between its memory sub-system 14 and its host (e.g., processing) sub-system 12, which, at least in some instances may facilitate improving operational efficiency and/or operational reliability of the computing system 10.

Returning to the process 92 of FIG. 5, after calibration of its operating modes, the computing system 10 may determine one or more of its target operating characteristics, for example, after commercial deployment and/or during normal operation (process block 96). As described above, in some embodiments, a set of target operating characteristics of a computing system 10 may include a target memory access latency to be provided by its memory sub-system 14 and/or its target power consumption. Thus, in such embodiments, determining the target operating characteristics may include determining a target memory access latency to be provided by the memory sub-system 14 of the computing system 10 (process block 138). Additionally or alternatively, determining the target operating characteristics may include determining a target power consumption of the computing system (process block 140).

Based at least in part on its target operating characteristics, the computing system 10 may selectively operate in different operating modes (process block 98). As described above, in some embodiments, the operating modes of a computing system 10 may include an efficiency mode. Thus, in such embodiments, selectively operating the computing system 10 in different operating modes may include selectively operating the computing system 10 in the efficiency mode, for example, when the target power consumption of the computing system 10 is below a power consumption threshold and/or when a target memory access latency of its memory sub-system 14 is not below a memory access latency threshold (process block 142). In other words, the computing system 10 may selectively implement the operational parameters calibrated for the efficiency mode based at least in part on one or more of its target operating characteristics.

Figure 10:
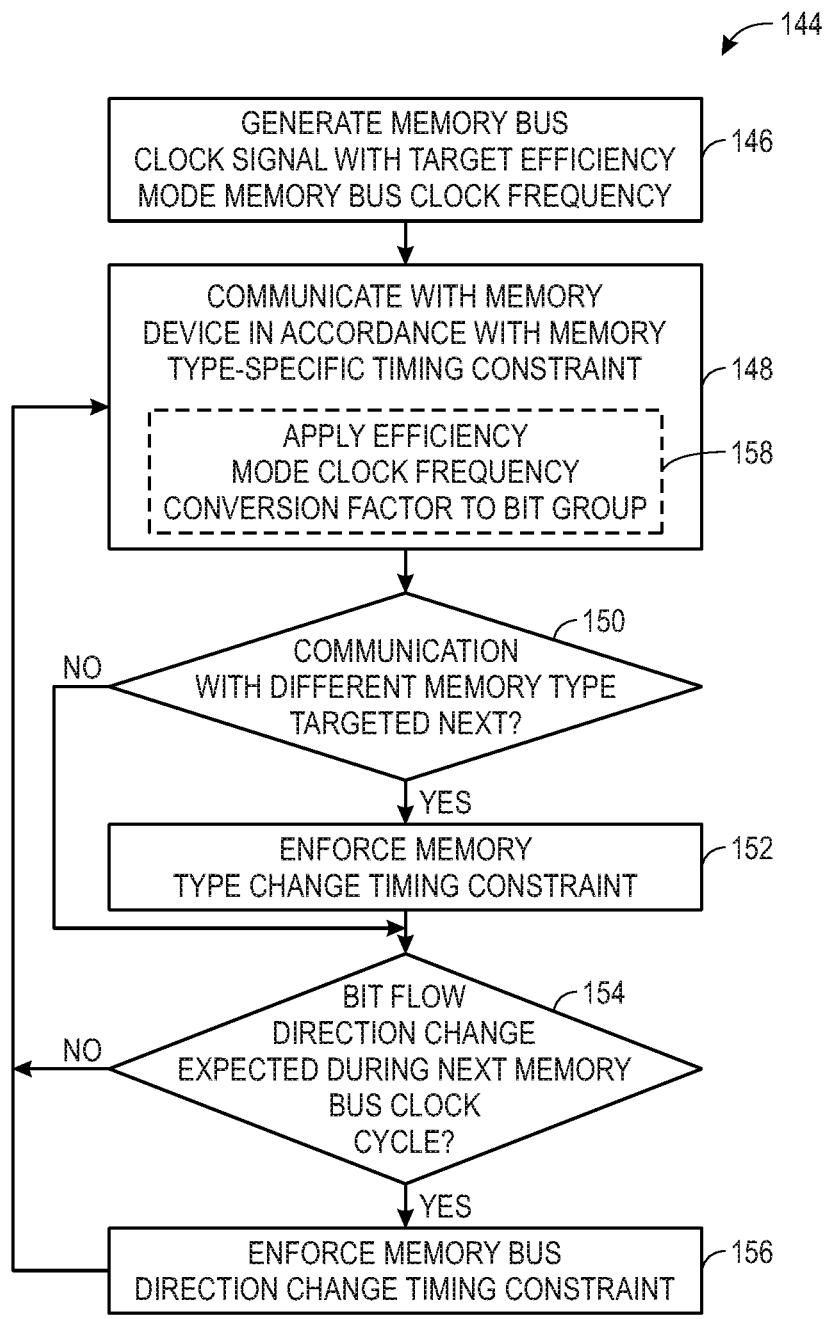
FIG. 10 is a flow diagram of an example process for operating the computing system of FIG. 1 in the efficiency mode, in accordance with an embodiment of the present disclosure.

To help illustrate, an example of a process 144 for operating a computing system 10 in an efficiency mode is described in FIG. 10. Generally, the process 144 includes generating a memory bus clock signal with a target efficiency mode memory bus clock frequency (process block 146), communicating with a memory device in accordance with a memory type-specific timing constraint (process block 148), and determining whether communication with a different memory type is targeted next (decision block 150). Additionally, the process 144 includes enforcing a memory type change timing constraint when communication with the different memory type is targeted next (process block 152), determining whether a bit flow direction change is expected during a next memory bus clock cycle (decision block 154), and enforcing a memory bus direction change timing constraint when a bit flow direction change is expected in the next memory bus clock cycle (process block 156).

Although described in a particular order, which represents a particular embodiment, it should be noted that the process 144 may be performed in any suitable order. Additionally, embodiments of the process 144 may omit process blocks and/or include additional process blocks. Furthermore, in some embodiments, the process 144 may be implemented at least in part by executing instructions stored in a tangible, non-transitory, computer-readable medium, such as memory implemented in a computing system 10, using processing circuitry, such as a processor implemented in the computing system 10.

Accordingly, in some embodiments, a computing system 10 generates a memory bus clock signal 68, which governs communication via a shared memory bus 20A implemented therein, with a target efficiency mode memory bus clock frequency, for example, set (e.g., calibrated and/or tuned) via the efficiency mode calibration process 126 of FIG. 8 (process block 146). In particular, while in the efficiency mode, in some embodiments, the computing system 10 may instruct a memory bus clock 30 to generate and/or output a memory bus clock signal 68 with the target efficiency mode memory bus clock frequency, for example, when the target efficiency mode memory bus clock frequency does not exactly match the frequency of any memory device clock signal 40 used in its memory sub-system 14. Additionally, as described above, in some embodiments, the target efficiency mode memory bus clock frequency may be set to match the frequency of a memory device clock signal 40 used by one or more memory devices 18 of a specific memory type. Thus, in some such embodiments, the computing system 10 may instruct a corresponding memory device clock 36 to supply the memory device clock signal 40 to a memory-side bus interface 60 and/or a host-side bus interface 78 as the memory bus clock signal 68 with the target efficiency mode memory bus clock frequency.

The computing system 10 may then enable communication with one or more memory devices 18 of a specific memory type via the shared memory bus 20A during a current efficiency mode memory bus clock cycle 135 in accordance with the efficiency mode memory bus clock signal 68 and one or more memory type-specific timing constraints 86 associated with the specific memory type (process block 148). For example, the computing system 10 may instruct the memory-side bus interface 60 and/or the host-side bus interface 78 to enforce a row-to-column timing constraint 84 associated with the specific memory type, a row-to-row timing constraint 84 associated with the specific memory type, a column-to-column timing constraint 84 associated with the specific memory type, a write-to-read timing constraint 84 associated with the specific memory type, or any combination thereof on communication with memory devices 18 of the specific memory type. However, as described above, in some embodiments, the target efficiency mode memory bus clock frequency may differ from the frequency of a memory device clock signal 40 used by memory device 18 of the specific memory type.

Thus, to facilitate interoperation while in the efficiency mode, as described above, in some embodiments, the computing system 10 may apply an efficiency mode clock frequency conversion factor 70B associated with a specific memory type to communication with a memory device 18 of the specific memory type. In other words, in such embodiments, the computing system 10 may apply an efficiency mode clock frequency conversion factor 70 associated with the specific memory type to one or more bit groups 120 communicated with the memory device 18 of the specific memory type (process block 158). For example, when the efficiency mode clock frequency conversion factor 70 associated with the specific memory type has a value of two, the computing system 10 may instruct the memory-side bus interface 60 to double (e.g., expand and/or increase) the duration of digital signals received from the shared memory bus 20A before output to the memory device 18 of the specific memory type and/or to halve (e.g., contract and/or decrease) the duration of digital signals received from the memory device 18 of the specific memory type before output to the shared memory bus 20A.

The computing system 10 may then determine whether communication with a memory device 18 of a memory type different from the specific memory type is targeted next (decision block 150). As described above, a host sub-system 12 may request (e.g., target) access to a storage location in a memory sub-system 14 via a memory access command, such as a memory read command that requests read access and/or a memory write command that requests write access, which includes a memory address parameter associated with a storage location in a memory sub-system 14 targeted by the memory access command. In other words, in some embodiments, the computing system 10 may determine a memory device 18 and, thus, a memory type of the memory device 18 targeted by a memory access command based at least in part on the memory address parameter indicated therein. Additionally, in some embodiments, one or more memory access commands may be stored in a command queue 82 before output to the memory sub-system 14 via the shared memory bus 20A. Accordingly, in such embodiments, the computing system 10 may determine (e.g., identify) the memory device 18 and, thus, the memory type that will be targeted next based at least in part on the address parameter indicated in a memory access command that is expected to be output next from the command queue 82.

When communication with a different memory type is expected to be targeted next, immediately before the change is expected to occur, the computing system 10 may enforce (e.g., introduce) a memory type change timing constraint 90, for example, which has a duration set (e.g., calibrated and/or tuned) via the efficiency mode calibration process 126 of FIG. 8 (process block 152). As described above, in some embodiments, the computing system 10 may enforce different memory type change timing constraints 90 depending on the memory type from which communication is being changed and/or the memory type to which communication is expected to be changed. For example, the computing system 10 may enforce a first memory type-to-Mth memory type timing constraint 90 immediately before communication via the shared memory bus 20A is expected to change from communication with memory devices 18 of the first memory type to communication with memory devices 18 of the Mth memory type. On the other hand, the computing system 10 may enforce an Mth memory type-to-first memory type timing constraint 90 immediately before communication via the shared memory bus 20A is expected to change from communication with memory devices 18 of the Mth memory type to communication with memory devices 18 of the first memory type.

Moreover, as described above, in some embodiments, the duration of a memory type change timing constraint 90, which is to be introduced immediately before communication is switched from a corresponding memory type to a different memory type, may be set (e.g., calibrated and/or tuned) to match the longest command-to-fulfillment timing constraint 84 associated with the corresponding memory type. By enforcing memory type change timing constraints 90 set in this manner, as described above, the computing system 10 may reduce likelihood that a subsequent memory access request is communicated to a memory device 18 before another memory device 18 of a different memory type completes fulfillment of a previous memory access request. In other words, as described above, enforcing memory type change timing constraints 90 set in this manner may facilitate reducing the likelihood of fulfillment of the subsequent memory access command conflicting with fulfillment of the previous memory access command at the shared memory bus 20A, which, at least in some instances, may facilitate improving operational efficiency and/or operational reliability of the computing system 10.

Additionally, the computing system 10 may determine whether bit flow direction in the shared memory bus 20A is expected to change during a next memory bus clock cycle (decision block 154). As described above, a bit flow direction change may occur when the shared memory bus 20A changes from transmission of bit groups 120 from the host sub-system 12 to the memory sub-system 14 to transmission of bit groups 120 from the memory sub-system 12 to the host sub-system 14 or vice versa. In other words, in some embodiments, a bit flow direction change may occur when a previous memory access command is a memory write command and a directly subsequent memory access command is a memory read command or vice versa.

In addition to a memory address parameters, in some embodiments, a memory access command may include an access type parameter that indicates the type of memory access being requested by the memory access command. For example, the access type parameter of a memory access command may be set (e.g., "1" bit or logic high) to request read access and, thus, indicate that the memory access command is a memory read command. On the hand, the access type parameter of a memory access command may be unset (e.g., "0" bit or logic low) to request write access and, thus, indicate that the memory access command is a memory write command. Accordingly, in such embodiments, the computing system 10 may determine whether a bit flow direction of the shared memory bus 20A is expected to change during the next memory bus clock cycle based at least in part on whether the access type indicated by an access type parameter of a memory access command, which is expected to be output next from the command queue 82, differs from the access type indicated by an access type parameter of a memory access command most recently output from the command queue 82.

When bit flow direction is expected to change, the computing system 10 may enforce (e.g., introduce) a memory bus direction change timing constraint 88 immediately before the bit flow direction change is expected to occur (process block 156). As described above, in some embodiments, the duration of a memory bus direction change timing constraint 88 may be set (e.g., tuned and/or calibrated) to facilitate accounting for the non-instantaneous nature of communication via the shared memory bus 20A. For example, to facilitate accounting for non-instantaneous propagation of digital (e.g., electrical and/or optical) signals on the shared memory bus 20A, the duration of the memory bus direction change timing constraint 88 may be set to match the duration of a clock cycle of the memory bus clock signal 68. Additionally or alternatively, the duration of the memory bus direction change timing constraint 88 may be set to match an expected duration for switching (e.g., gating) input/output (I/O) circuitry in the memory-side bus interface 60 and/or the host-side bus interface 78 between its transmission state and its reception state.

By enforcing a memory bus direction change timing constraint 88 set in this manner, as described above, the computing system 10 may reduce the likelihood of the non-instantaneous nature of communication via the shared memory bus 20A resulting in a conflict occurring at the shared memory bus 20A, which, at least in some instances, may facilitate improving operational reliability of the computing system 10 while in the efficiency mode. Additionally, as described above, the target efficiency mode memory bus clock frequency may be set lower than a target performance mode memory bus clock frequency and, thus, facilitate reducing power consumption of the computing system 10, which, at least in some instances, may facilitate improving the operational efficiency of the computing system. In this manner, a computing system 10 may operate in an efficiency mode by implemented one or more corresponding operational parameters.

Returning to the process 92 of FIG. 5, as described above, the operating modes of the computing system 10 may additionally include a performance mode. Thus, in such embodiments, selectively operating the computing system 10 in different operating modes may include selectively operating the computing system 10 in the performance mode, for example, when the target power consumption of the computing system 10 is not below the power consumption threshold and/or when the target memory access latency of its memory sub-system 14 is below the memory access latency threshold (process block 160). In other words, the computing system 10 may selectively implement the operational parameters calibrated for the performance mode based at least in part on one or more of its target operating characteristics.

Figure 11:
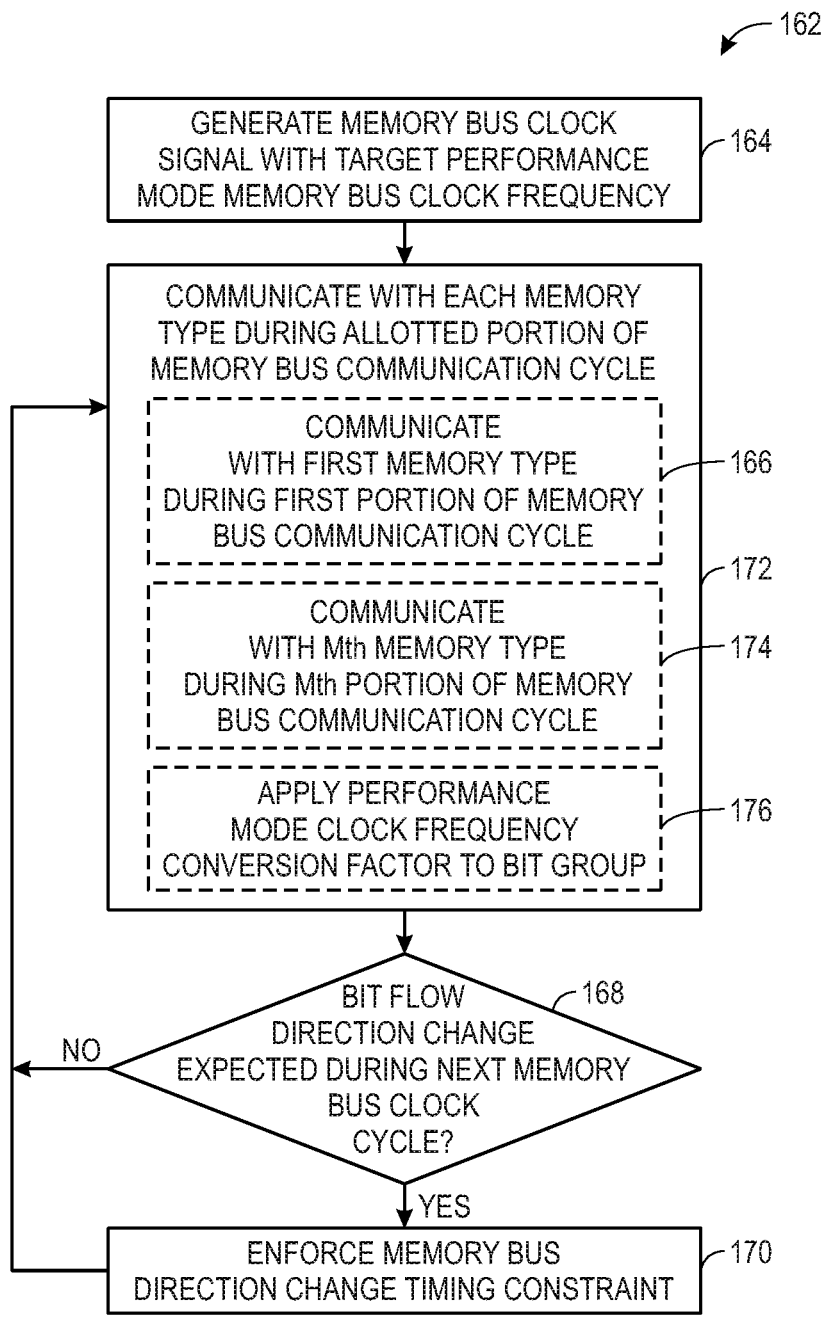
FIG. 11 is a flow diagram of an example process for operating the computing system of FIG. 1 in the performance mode, in accordance with an embodiment of the present disclosure.

To help illustrate, an example of a process 162 for operating a computing system 10 in a performance mode is described in FIG. 11. Generally, the process 162 includes generating a memory bus clock signal with a target performance mode memory bus clock frequency (process block 164) and communicating with each memory type during an allotted portion of a memory bus communication cycle (process block 166). Additionally, the process 162 includes determining whether a bit flow direction change is expected during a next memory bus clock cycle (decision block 168) and enforcing a memory bus direction change timing constraint when a bit flow direction change is expected in the next memory bus clock cycle (process block 170).

Although described in a particular order, which represents a particular embodiment, it should be noted that the process 162 may be performed in any suitable order. Additionally, embodiments of the process 162 may omit process blocks and/or include additional process blocks. Furthermore, in some embodiments, the process 162 may be implemented at least in part by executing instructions stored in a tangible, non-transitory, computer-readable medium, such as memory implemented in a computing system 10, using processing circuitry, such as a processor implemented in the computing system 10.

Accordingly, in some embodiments, a computing system 10 may generate a memory bus clock signal 68, which governs communication via a shared memory bus 20A implemented therein, with a target performance mode memory bus clock frequency, for example, set (e.g., calibrated and/or tuned) via the performance mode calibration process 102 of FIG. 6 (process block 164). In particular, while in the performance mode, in some embodiments, the computing system 10 may instruct a memory bus clock 30 to generate and/or output a memory bus clock signal 68 with the target performance mode memory bus clock frequency. The computing system 10 may then enable communication with memory devices 18 of each memory type implemented in its memory sub-system 14 during a corresponding specifically allocated portion (e.g., durations and/or time period) of a performance mode memory bus communication cycle 122 (process block 166).

As described above, in the performance mode, different portions of a performance mode memory bus communication cycle 122 may be specifically allocated for communication with each of the different memory types in the memory sub-system 14. For example, when the memory sub-system 14 includes one or more memory devices 18 of a first memory type and one or more memory devices 18 of an Mth (e.g., different) memory type, a first portion of each performance mode memory bus communication cycle 122 may be allocated for (e.g., dedicated to) communication with the one or more memory devices 18 of the first memory type and an Mth (e.g., different and/or non-overlapping) portion of each performance mode memory bus communication cycle 122 may be allocated for communication with the one or more memory devices 18 of the Mth memory type. As such, while in the performance mode, the computing system 10 may enable communication with the one or more memory devices 18 of the first memory type during the first portion of each performance mode memory bus communication cycle 122 (process block 172), enable communication with the one or more memory devices 18 of the Mth memory type during the Mth portion of each performance mode memory bus communication cycle 122 (process block 174), and so on. However, as described above, in some embodiments, the target performance mode memory bus clock frequency may differ from the frequency of each memory device clock signal 40 used in the memory sub-system 14.

Thus, to facilitate interoperation while in the performance mode, as described above, in some embodiments, the computing system 10 may apply a performance mode clock frequency conversion factor 70A associated with a specific memory type to communication with a memory device 18 of the specific memory type. In other words, in such embodiments, the computing system 10 may apply a performance mode clock frequency conversion factor 70A associated with the specific memory type to one or more bit groups 120 communicated with the memory device 18 of the specific memory type (process block 176). For example, when the efficiency mode clock frequency conversion factor 70 associated with the specific memory type has a value of three, the computing system 10 may instruct the memory-side bus interface 60 to triple (e.g., expand and/or increase) the duration of digital signals received from the shared memory bus 20A before output to the memory device 18 of the specific memory type and/or to reduce (e.g., contract and/or decrease) the duration of digital signals received from the memory device 18 of the specific memory type by two thirds before output to the shared memory bus 20A.

The computing system 10 may then determine whether bit flow direction in the shared memory bus 20A is expected to change during a next memory bus clock cycle (decision block 168). As described above, a bit flow direction change may occur when the shared memory bus 20A changes from transmission of bit groups 120 from the host sub-system 12 to the memory sub-system 14 to transmission of bit groups from the memory sub-system 12 to the host sub-system 14 or vice versa. In other words, in some embodiments, a bit flow direction change may occur when a previous memory access command is a memory write command and a directly subsequent memory access command is a memory read command or vice versa.

As described above, in addition to a memory address parameters, in some embodiments, a memory access command may include an access type parameter that indicates the type of memory access being requested by the memory access command. For example, the access type parameter of a memory access command may be set (e.g., "1" bit or logic high) to request read access and, thus, indicate that the memory access command is a memory read command. On the hand, the access type parameter of a memory access command may be unset (e.g., "0" bit or logic low) to request write access and, thus, indicate that the memory access command is a memory write command. Accordingly, in such embodiments, the computing system 10 may determine whether a bit flow direction of the shared memory bus 20A is expected to change during the next memory bus clock cycle based at least in part on whether the access type indicated by an access type parameter of a memory access command, which is expected to be output next from the command queue 82, differs from the access type indicated by an access type parameter of a memory access command most recently output from the command queue 82.

When a bit flow direction is expected to change, the computing system 10 may enforce (e.g., introduce) a memory bus direction change timing constraint 88 immediately before the bit flow direction change is expected to occur (process block 170). As described above, in some embodiments, the duration of a memory bus direction change timing constraint 88 may be set (e.g., tuned and/or calibrated) to facilitate accounting for the non-instantaneous nature of communication via the shared memory bus 20A. For example, to facilitate accounting for non-instantaneous propagation of digital (e.g., electrical and/or optical) signals on the shared memory bus 20A, the duration of the memory bus direction change timing constraint 88 may be set to match the duration of a clock cycle of the memory bus clock signal 68. Additionally or alternatively, the duration of the memory bus direction change timing constraint 88 may be set to match an expected duration for switching (e.g., gating) input/output (I/O) circuitry in the memory-side bus interface 60 and/or the host-side bus interface 78 between its transmission state and its reception state.

By enforcing a memory bus direction change timing constraint 88 set in this manner, as described above, the computing system 10 may reduce the likelihood of the non-instantaneous nature of communication via the shared memory bus 20A resulting in a conflict occurring at the shared memory bus 20A, which, at least in some instances, may facilitate improving operational reliability of the computing system 10 while in the performance mode. Additionally, as described above, the target performance mode memory bus clock frequency may be set higher than the target efficiency mode memory bus clock frequency and, thus, facilitate improving (e.g., reducing) memory access latency, which, at least in some instances, may facilitate improving the operational efficiency of the computing system. In this manner, a computing system 10 may operate in a performance mode by implemented one or more corresponding operational parameters.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising:
a host system, wherein the host system comprises processing circuitry configured to perform a data processing operation;
a memory system comprising a first memory type that is subject to a first memory type-specific timing constraint and a second memory type different from the first memory type that is subject to a second memory type-specific timing constraint different from the first memory type-specific timing constraint; and
a shared memory bus coupled between the host system and the memory system, wherein:
the shared memory bus is shared by the first memory type and the second memory type; and
the apparatus is configured to:
selectively operate in a performance mode that sets a memory bus clock signal frequency higher than a first memory device clock signal frequency used by each memory device of the first memory type and a second memory device clock signal frequency used by each memory device of the second memory type when a target memory access latency of the memory system is below a latency threshold, a target power consumption of the apparatus is not below a power consumption threshold, or both, based at least in part on the first memory type-specific timing constraint and the second memory type-specific timing constraint via the shared memory bus;
selectively operate in an efficiency mode that sets the memory bus clock signal frequency lower than the memory bus clock signal frequency used by the performance mode when the target memory access latency of the memory system is not below the latency threshold, the target power consumption of the apparatus is below the power consumption threshold, or both, based at least in part on the first memory type-specific timing constraint and the second memory type-specific timing constraint via the shared memory bus;
allocate a first time period to communicate with the first memory type using the memory bus clock signal frequency via the shared memory bus at least in part by enforcing the first memory type-specific timing constraint during the first time period to facilitate eliminating likelihood of a conflict occurring at the shared memory bus during the first time period;
allocate a second time period different from the first time period to communicate with the second memory type using the memory bus clock signal frequency via the shared memory bus at least in part by enforcing the second memory type-specific timing constraint during the second time period to facilitate eliminating likelihood of a conflict occurring at the shared memory bus during the second time period; and
communicate via the shared memory bus in accordance with the memory bus clock signal frequency.

2. The apparatus of claim 1, wherein the apparatus is configured to:
not enforce the second memory type-specific timing constraint associated with the second memory type during the first time period used to communicate with the first memory type via the shared memory bus; and
not enforce the first memory type-specific timing constraint associated with the first memory type during the second time period used to communicate with the second memory type via the shared memory bus.

3. The apparatus of claim 1, wherein:
the memory system comprises:
a first one or more memory devices of the first memory type, wherein each of the first one or more memory devices is configured to operate in accordance with the first memory device clock signal frequency; and
a second one or more memory devices of the second memory type, wherein each of the second one or more memory devices is configured to operate in accordance with the second memory device clock signal frequency different from the first memory device clock signal frequency used by the first one or more memory devices; and
wherein the apparatus is configured to communicate via the shared memory bus in accordance with the memory bus clock signal frequency that differs from the first memory device clock signal frequency used by the first one or more memory devices, the second memory device clock signal frequency used by the second one or more memory devices, or both.

4. The apparatus of claim 3, wherein:
the first one or more memory devices comprise one or more volatile memory devices; and
the second one or more memory devices comprise one or more non-volatile memory devices.

5. The apparatus of claim 3, wherein:
the first one or more memory devices comprise one or more dynamic random-access memory devices; and
the second one or more memory devices comprise one or more static random-access memory devices.

6. The apparatus of claim 1, wherein, when a target memory access latency of the memory system is not below a latency threshold, a target power consumption of the apparatus is below a power consumption threshold, or both, the apparatus is configured to:
enforce a first memory type change timing constraint between the first time period and the second time period immediately before communication via the shared memory bus is expected to change from communication with the first memory type during the first time period to subsequently communicating with the second memory type during the second time period; and
enforce a second memory type change timing constraint different from the first memory type change timing constraint between the second time period and the first time period immediately before communication via the shared memory bus is expected to change from communication with the second memory type during the second time period to subsequently communicating with the first memory type during the first time period.

7. The apparatus of claim 6, wherein:
the first memory type change timing constraint is set to match a first duration of a first longest command-to-fulfillment timing constraint associated with the first memory type; and
the second memory type change timing constraint is set to match a second duration of a second longest command-to-fulfillment timing constraint associated with the second memory type.

8. The apparatus of claim 1, wherein, when a target memory access latency of the memory system is below a latency threshold, a target power consumption of the apparatus is not below a power consumption threshold, or both, the apparatus is configured to:
communicate with the first memory type via the shared memory bus using the first time period during each communication cycle of the shared memory bus; and
communicate with the second memory type via the shared memory bus using the second time period during each communication cycle of the shared memory bus.

9. The apparatus of claim 8, wherein:
the apparatus is configured to communicate via the shared memory bus in accordance with the memory bus clock signal frequency;
each memory device of the first memory type is configured to operate in accordance with the first memory device clock signal frequency different from the memory bus clock signal frequency;
each memory device of the second memory type is configured to operate in accordance with the second memory device clock signal frequency different from the first memory device clock signal frequency and the memory bus clock signal frequency;
a first duration of the first time period during each communication cycle of the shared memory bus specifically allocated to communication with the first memory type is set based at least in part on a first ratio of the memory bus clock signal frequency to the first memory device clock signal frequency; and
a second duration of the second time period during each communication cycle of the shared memory bus specifically allocated to communication with the second memory type is set based at least in part on a second ratio of the memory bus clock signal frequency to the second memory device clock signal frequency.

10. A method comprising:
determining a set of one or more target operating characteristics of a computing system, wherein the set of one or more target operating characteristics comprises a target power consumption of the computing system or a target memory access latency of a memory sub-system deployed in the computing system, or both; and
communicating command/address signals, data signals, or both, via a shared memory bus shared by memory devices of multiple different memory types implemented in the memory sub-system and a host sub-system of the computing system using different operating modes based at least in part on the set of one or more target operating characteristics, wherein each memory type of the multiple different memory types is subject to one or more memory-type specific timing constraint, and wherein communicating the command/address signals, the data signals, or both, with the multiple different memory types comprises:
communicating using a performance mode at a target memory bus clock frequency of the performance mode higher than a clock frequency used by each of the multiple different memory types when the target power consumption of the computing system is equal to or above a first threshold or the target memory access latency of the memory sub-system is below a second threshold, or both, wherein the target memory bus clock frequency of the performance mode is determined based on one or more operating parameters of the performance mode and the one or more memory-type specific timing constraint of each of the multiple different memory types; and
communicating using an efficiency mode at a target memory bus clock frequency of the efficiency mode lower than the target memory bus clock frequency of the performance mode when the target power consumption of the computing system is below the first threshold or the target memory access latency of the memory sub-system is equal to or above the second threshold, or both, wherein the target memory bus clock frequency of the efficiency mode is determined based on one or more operating parameters of the efficiency mode and the one or more memory-type specific timing constraint of each of the multiple different memory types.

11. The method of claim 10, wherein communicating using the performance mode comprises:
specifically allocating a first portion of each communication cycle of the shared memory bus to communication with a first memory type implemented in the memory sub-system;
instructing the computing system to enable communication with a first one or more memory devices of the first memory type during the first portion of each communication cycle at least in part by enforcing a first one or more memory type-specific timing constraints associated with the first memory type during the first portion of each communication cycle;

specifically allocating a second portion of each communication cycle of the shared memory bus different from the first portion to communication with a second memory type implemented in the memory sub-system; and instructing the computing system to enable communication with a second one or more memory devices of the second memory type during the second portion of each communication cycle at least in part by enforcing a second one or more memory type-specific timing constraints associated with the second memory type during the second portion of each communication cycle.

12. The method of claim 11, comprising calibrating the one or more operating parameters of the performance mode before communicating using the performance mode at least in part by:

determining a target duration of a performance mode memory bus communication cycle based at least in part on a least common multiple of a first clock cycle duration of a first memory device clock signal used by each of the first one or more memory devices of the first memory type and a second clock cycle duration of a second memory device clock signal used by each of the second one or more memory devices of the second memory type;

determining a target bandwidth of the performance mode memory bus communication cycle based at least in part on a first maximum communication bandwidth sustainable by the first memory type over a time period that matches the target duration of the performance mode memory bus communication cycle and a second maximum communication bandwidth sustainable by the second memory type over the time period that matches the target duration of the performance mode memory bus communication cycle; and determining the target memory bus clock frequency of the performance mode at least in part by dividing the target bandwidth of the performance mode memory bus communication cycle by a bit width of the shared memory bus and the target duration of the performance mode memory bus communication cycle.

13. The method of claim 12, wherein calibrating the one or more operating parameters of the performance mode comprises:

setting a first performance mode clock frequency conversion factor associated with the first memory type based at least in part on a first ratio of the target memory bus clock frequency of the performance mode to a first frequency of the first memory device clock signal used by each of the first one or more memory devices of the first memory type; and setting a second performance mode clock frequency conversion factor associated with the second memory type based at least in part on a second ratio of the target memory bus clock frequency of the performance mode to a second frequency of the second memory device clock signal used by each of the second one or more memory devices of the second memory type.

14. The method of claim 12, wherein:

specifically allocating the first portion of each communication cycle of the shared memory bus to communication with the first memory type comprises setting a first target duration of the first portion such that a ratio of the first target duration of the first portion to the target duration of the performance mode memory bus communication cycle matches a ratio of a first frequency of the first memory device clock signal used by each of the first one or more memory devices of the first memory type to the target memory bus clock frequency of the performance mode; and specifically allocating the second portion of each communication cycle of the shared memory bus to communication with the second memory type comprises setting a second target duration of the second portion such that a ratio of the second target duration of the second portion to the target duration of the performance mode memory bus communication cycle matches a ratio of a second frequency of the second memory device clock signal used by each of the second one or more memory devices of the second memory type to the target memory bus clock frequency of the performance mode.

15. The method of claim 10, wherein communicating using the efficiency mode comprises:

instructing the computing system to enable communication with a first one or more memory devices of a first memory type implemented in the memory sub-system during a first communication cycle of the shared memory bus at least in part by enforcing a first one or more memory type-specific timing constraints associated with the first memory type during the first communication cycle of the shared memory bus;

instructing the computing system to enable communication with a second one or more memory devices of a second memory type implemented in the memory sub-system during a second communication cycle of the shared memory bus at least in part by enforcing a second one or more memory type-specific timing constraints associated with the second memory type during the second communication cycle of the shared memory bus; and instructing the computing system to enforce a first memory type change timing constraint associated with the first memory type between the first communication cycle of the shared memory bus and the second communication cycle of the shared memory bus.

16. The method of claim 15, comprising calibrating the one or more operating parameters of the efficiency mode before communicating using the efficiency mode at least in part by:

setting a target efficiency mode memory bus clock frequency to match a first frequency of a first memory device clock signal used by each of a first one or more memory devices of a first memory type implemented in the memory sub-system, wherein the first frequency of the first memory device clock signal differs from a second frequency of a second memory device clock signal used by each of a second one or more memory device of a second memory type implemented in the memory sub-system;

setting a first duration of the first memory type change timing constraint associated with the first memory type to match a first longest command-to-fulfillment timing constraint associated with the first memory type; and setting a second duration of a second memory type change timing constraint associated with the second memory type to match a second longest command-to-fulfillment timing constraint associated with the second memory type.

17. A memory system comprising:
a first memory device of a first memory type, wherein the first memory device is configured to operate in accordance with a first memory device clock signal frequency subject to at least a first memory type-specific timing constraint associated with the first memory type;
a second memory device of a second memory type different from the first memory type, wherein the second memory device is configured to operate in accordance with a second memory device clock signal frequency different from the first memory device clock signal frequency subject to at least a second memory type-specific timing constraint associated with the second memory type; and
a first portion of a memory-side bus interface communicatively coupled to the first memory device of the first memory type and a second portion of the memory-side bus interface communicatively coupled to the second memory device of the second memory type via a shared memory bus that is configured to enable communication by the first memory device of the first memory type and the second memory device of the second memory type, wherein the first portion of the memory-side bus interface is configured to facilitate communication between the shared memory bus and the memory system via the shared memory bus at least in part by converting a first digital signal between the first memory device clock signal frequency used by the first memory device and a memory bus clock signal frequency used by the shared memory bus that differs from the first memory device clock signal frequency, wherein the memory system is configured to:
  selectively operate in a performance mode that sets the memory bus clock signal frequency higher than the first memory device clock signal frequency used by the first memory device of the first memory type and the second memory device clock signal frequency used by the second memory device of the second memory type when a target memory access latency of the memory system is below a latency threshold, a target power consumption of the memory system is not below a power consumption threshold, or both, based at least in part on the first memory type-specific timing constraint and the second memory type-specific timing constraint via the shared memory bus;
  selectively operate in an efficiency mode that sets the memory bus clock signal frequency lower than the memory bus clock signal frequency used by the performance mode when the target memory access latency of the memory system is not below the latency threshold, the target power consumption of the memory system is below the power consumption threshold, or both, based at least in part on the first memory type-specific timing constraint and the second memory type-specific timing constraint via the shared memory bus; and
  communicate via the shared memory bus in accordance with the memory bus clock signal frequency.

18. The memory system of claim 17, wherein:
the memory bus clock signal frequency used for communication via the shared memory bus differs from the second memory device clock signal frequency used by the second memory device when the target memory access latency of the memory system is less than a latency threshold, the target power consumption is greater than or equal to a power consumption threshold, or both; and
the second portion of the memory-side bus interface is configured to facilitate communication between the shared memory bus and the memory system at least in part by converting a second digital signal between the second memory device clock signal frequency used by the second memory device and the memory bus clock signal frequency.

19. The memory system of claim 17, wherein the memory bus clock signal frequency that governs communication via the shared memory bus is set to match the second memory device clock signal frequency used by the second memory device when the target memory access latency of the memory system is greater than or equal to a latency threshold, the target power consumption is less than a power consumption threshold, or both.

20. The memory system of claim 17, wherein, when the target memory access latency of the memory system is less than a latency threshold, the target power consumption is greater than or equal to a power consumption threshold, or both:
  the first portion of the memory-side bus interface is configured to enable communication with a first one or more memory devices of the first memory type during a first portion of each communication cycle of the shared memory bus at least in part by enforcing a first one or more memory type-specific timing constraints associated with the first memory type during the first portion of each communication cycle of the shared memory bus; and
  the second portion of the memory-side bus interface is configured to enable communication with a second one or more memory devices of the second memory type during a second portion of each communication cycle of the shared memory bus at least in part by enforcing a second one or more memory type-specific timing constraints associated with the second memory type during the second portion of each communication cycle of the shared memory bus.

21. The memory system of claim 17, wherein, when a target memory access latency of the memory system is greater than or equal to a latency threshold, a target power consumption is less than a power consumption threshold, or both:
  the first portion of the memory-side bus interface is configured to enable communication with a first one or more memory devices of the first memory type during a first communication cycle of the shared memory bus at least in part by enforcing a first one or more memory type-specific timing constraints associated with the first memory type during the first communication cycle of the shared memory bus; and
  the second portion of the memory-side bus interface is configured to enable communication with a second one or more memory devices of the second memory type during a second communication cycle of the shared memory bus different from the first communication cycle at least in part by enforcing a second one or more memory type-specific timing constraints associated with the second memory type during the second communication cycle of the shared memory bus.

22. The memory system of claim 17, wherein the first portion of the memory-side bus interface, the second portion of the memory-side bus interface, or both, are configured to facilitate communication between the shared memory bus and the memory system at least in part by:
    extending duration of the first digital signal before supply to the first memory device when the first digital signal is received from the shared memory bus; and
    contracting duration of the first digital signal before supply to the shared memory bus when the first digital signal is received from the first memory device.

* * * * *